United States Patent [19]

Florent et al.

[11] Patent Number: 5,586,231

[45] Date of Patent: Dec. 17, 1996

[54] METHOD AND DEVICE FOR PROCESSING AN IMAGE IN ORDER TO CONSTRUCT FROM A SOURCE IMAGE A TARGET IMAGE WITH CHARGE OF PERSPECTIVE

[75] Inventors: Raoul Florent, Valenton; Pierre Lelong, Nogent-Sur-marne, both of France

[73] Assignee: U.S. Philips Corporation, New York, N.Y.

[21] Appl. No.: 359,364

[22] Filed: Dec. 20, 1994

[30] Foreign Application Priority Data

Dec. 29, 1993 [FR] France .................. 93 15804

[51] Int. Cl.$^6$ .................................. G06T 15/20
[52] U.S. Cl. .................................. 395/125; 395/127
[58] Field of Search .................... 395/119, 125, 395/127; 348/580, 581, 583, 584

[56] References Cited

U.S. PATENT DOCUMENTS

| | | | |
|---|---|---|---|
| 4,734,690 | 3/1988 | Waller | 395/127 |
| 4,752,828 | 6/1988 | Chapuis et al. | 348/580 |
| 4,807,158 | 2/1989 | Blanton et al. | 395/125 |
| 4,969,036 | 11/1990 | Bhanu et al. | 348/113 |
| 5,444,478 | 8/1995 | Lelong et al. | 348/39 |

OTHER PUBLICATIONS

"Computer Image Processing and Recognition" E.K. Hall, Academic Press 1979 Chapter 3, pp. 76 ET SEQ. pp. 76–88.

*Primary Examiner*—Heather R. Herndon
*Assistant Examiner*—Cliff N. Vo
*Attorney, Agent, or Firm*—Edward W. Goodman

[57] ABSTRACT

A method of processing a digital image in order to construct a calculated image, termed the target image (I*), which represents a so-called source image (I) reconstructed with modifications to the tilting angle, panning angle and scale factor in relation to this source image. This method includes determining a common view point (P), for the source image (I) and the target image (I*), as the origin of an orthonormal reference frame; and calculating, for every pixel (M*) with address (X*, Y*) in the target image (I*), spherical coordinates ($\alpha$, $\beta$) by a linear function $G^{-1}$ such that ($\alpha$, $\beta$)=$G^{-1}$ (X*Y*), the coefficients being functions of the modified tilting and panning angles and scale factor. Finally, the method includes reading a pair (X, Y) which is stored in a table and which constitutes the address of a point (M), in the source image (I), corresponding to the pixel (M*) in the target image (I*), by the matching, to the resolution of the table, the spherical coordinates ($\alpha$, $\beta$) with one of the addresses ($\alpha_o$, $\beta_o$) of the table.

20 Claims, 9 Drawing Sheets

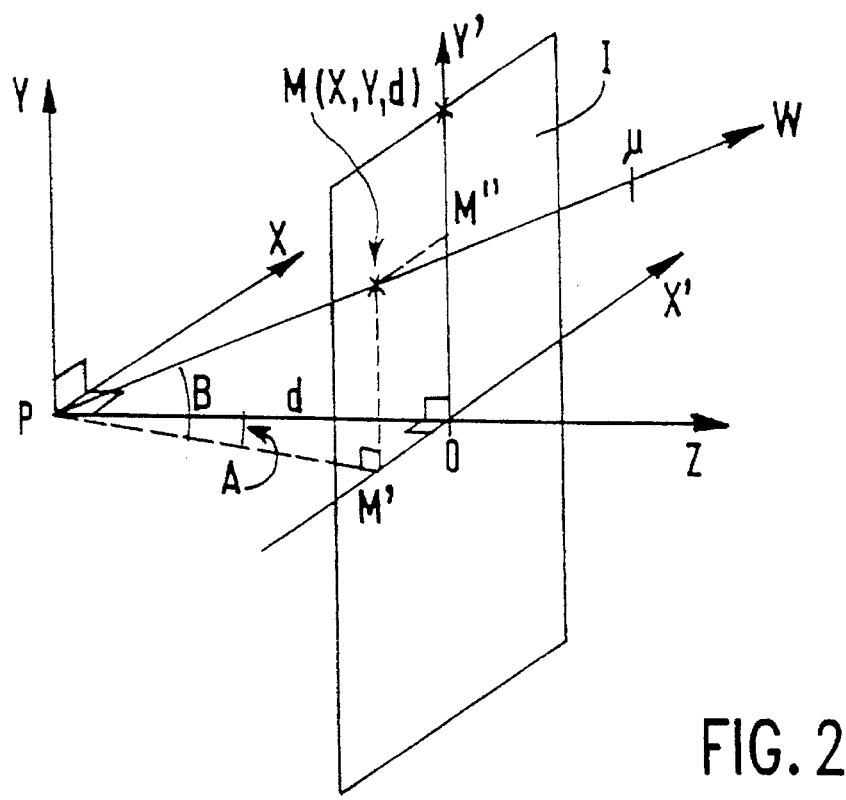
FIG. 2
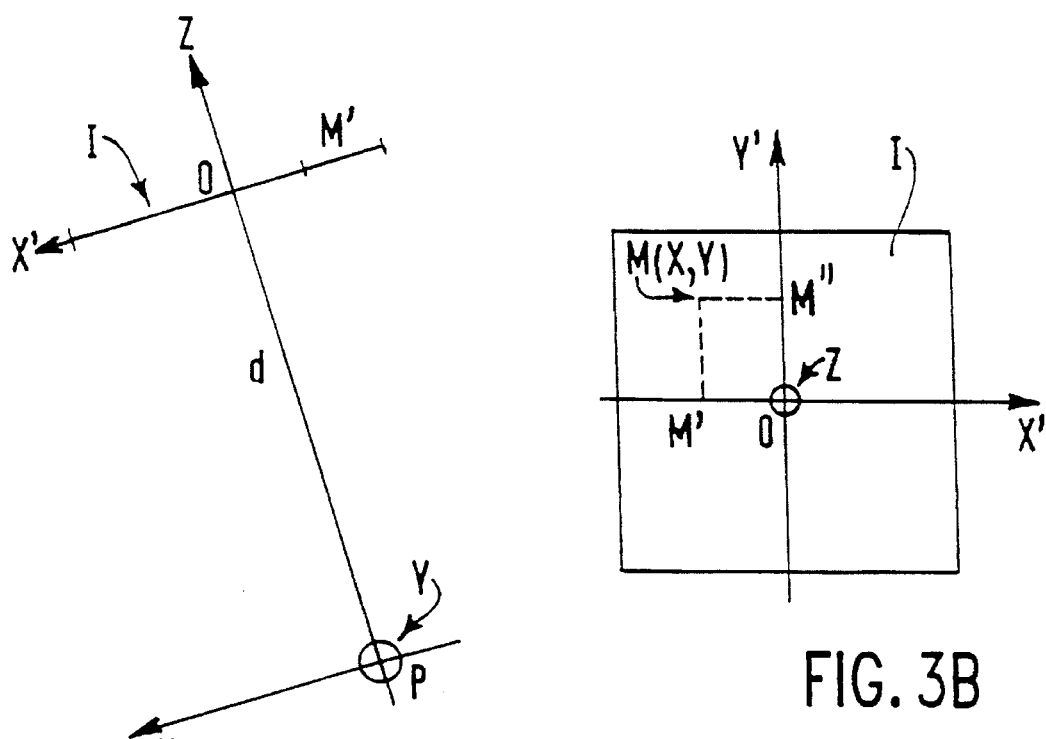
FIG. 3A
FIG. 3B

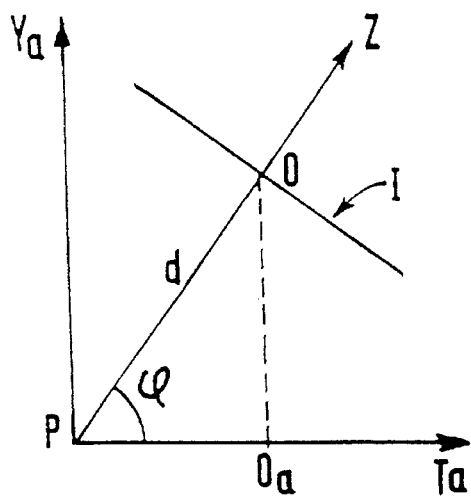
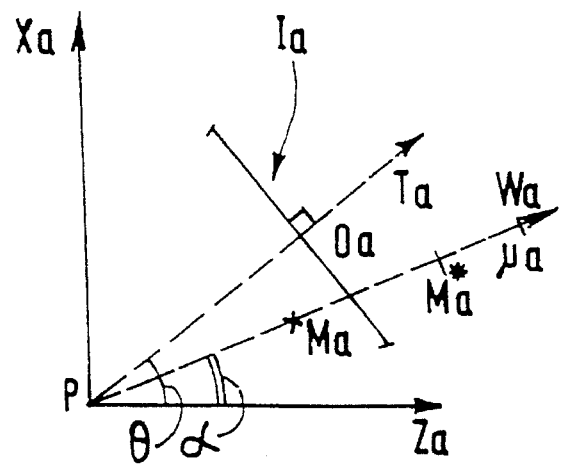
FIG. 6A FIG. 6B
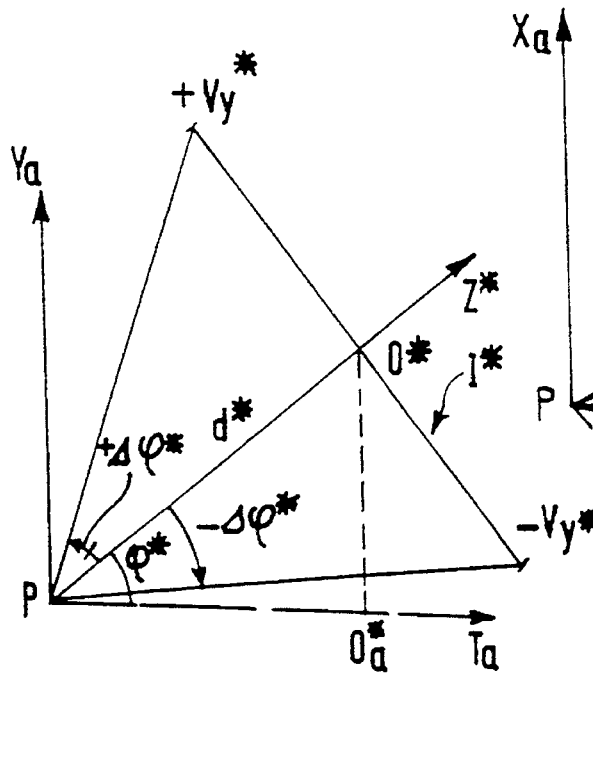
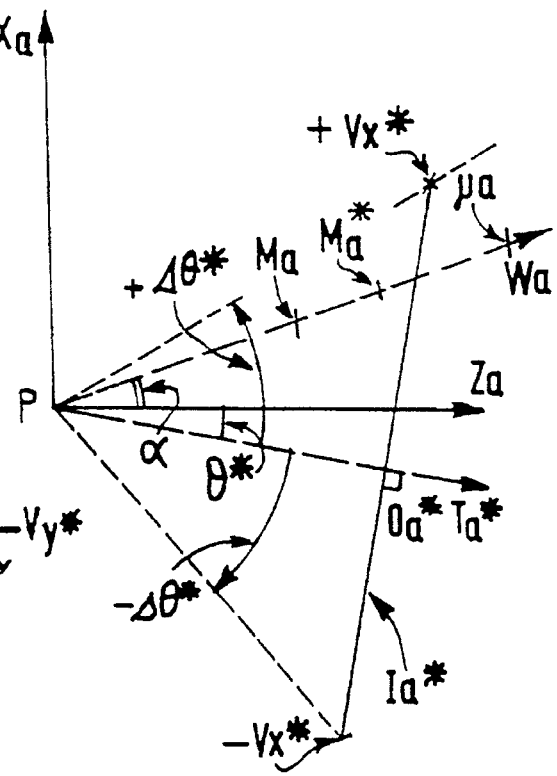
FIG. 7A FIG. 7B

METHOD AND DEVICE FOR PROCESSING AN IMAGE IN ORDER TO CONSTRUCT FROM A SOURCE IMAGE A TARGET IMAGE WITH CHARGE OF PERSPECTIVE

BACKGROUND OF THE INVENTION

1. Field of the Invention

The invention relates to a method of processing a digital image in order to construct, by means of a geometrical perspective transformation applied to an image termed the source image, a calculated image, termed the target image, which represents the source image reconstructed with modifications of the tilting angle and of the panning angle, and possibly of the scale factor in relation to the source image.

The invention also relates to a device for processing digital images which implements this method.

The invention finds its application in the construction of surveillance systems comprising a certain number of fixed cameras arranged in such a way that their individual fields of view blend to form a wide-angle field of view, for observing a panoramic scene.

2. Description of the Related Art

A process, capable of culminating in a device, for carrying out a geometrical perspective transformation is already known from the publication "Computer Image Processing and Recognition" by Ernest L. HALL, in "Academic Press 1979, "A Subsidiary of Harcourt Brace Jonanovitch Publishers, New York, London, Toronto, Sydney, San Francisco"—Chapter 3, pp. 76 et seq., especially pp. 76–88.

This publication teaches the definitions pertaining to perspective geometry and to a perspective transformation and an inverse perspective transformation, depending on whether it is imagined that we are passing from the points of an image to the light rays passing through these points, or else that we are passing from the light rays to the points of the image. The operation of passing from the points of an image to the rays which correspond to these points is called "perspective transformation".

This publication teaches a process firstly for formulating the problem of passing from points to rays, and next for solving this "perspective transformation" problem using 4×4 matrices. This problem is solved with a complete analytical calculation based on these matrices.

The formalizing of the problem by means of 4×4 matrices is based on the following considerations: theoretically, perspective transformations are geometrical problems which are posed in 3-dimensional space, hence, using 3 types of coordinates only; in this publication it is taught that the perspective transformation is not a linear transformation, and this results in difficulties in handling the equations; this publication then teaches that the solving of the equations can however be simplified, by linearizing these equations, this being possible if a fourth variable is added; thus, these linearized equations can be solved analytically.

Nevertheless, the process taught by the cited publication leads to solutions with extremely complex formulations. Examples are given throughout the cited publication.

Now, according to the present invention, a first constraint is imposed involving the implementation of perspective transformations in real time, that is to say while processing an image at the rate of 16 to 25 images formed per second.

It appears that the solutions formulated according to the teaching of the cited publication are particularly difficult to implement in real time, owing to their complexity.

There are, however, electronic devices called "transform chips" which are available commercially and capable of performing geometrical transformations and which can be used to solve the problem of perspective transformations.

In particular, a commercial product is known, referenced TMC 2302, available from TRW Company whose address is PO Box 2472, LA JOLLA, Calif. 92 038 (U.S.). This product is capable of performing very complicated calculations in real time, relating to the geometrical transformations required for the envisaged perspective transformations.

However, these transform chips are expensive, especially because of the fact that they are not widely used; there is little hope of seeing their cost come down soon. Moreover, their implementation within a signal processing device, such as that envisaged according to the invention, must be regarded as involving a number of constraints which are difficult to overcome.

Nevertheless, having overcome these constraints, reconstruction of the target image, as defined in the preamble, gives a result which might be termed reconstruction according to an "exact perspective". By using the transform chips, the objects in the target image are seen in a geometrical perspective which is very close to that which would be obtained if this target image were formed directly, that is to say by means of a real camera oriented together with the parameters producing the geometrical perspective chosen for this image termed target image.

SUMMARY OF THE INVENTION

An objective of the invention is therefore to provide a device which undertakes the function of reconstruction of a target image as defined in the preamble, while circumventing the need to use complex geometrical transformations which can only be carried out by means of known commercial products, at great expense and with ancillary technical difficulties which are difficult to surmount.

According to the invention this objective is achieved by means of an image processing method such as defined in the preamble and characterized in that it comprises:

the determination of a common view point for the source image and the target image, the origin of an orthonormal reference frame;

the calculation, for every pixel termed the starting pixel with address $(X^*, Y^*)$ in the target image of a pair of so-called spherical coordinates $(\alpha, \beta)$ by means of a linear function $G^{-1}$ such that $(\alpha, \beta) = G^{-1}(X^*, Y^*)$, the coefficients of which are functions of the modified tilting and panning angles and scale factor.

An advantage of the method according to the invention is that it can be implemented using merely memory cards. These memory cards are nowadays inexpensive and their prices are continually falling, alongside a continual improvement in quality and density.

Thus, the functions required to implement the "perspective transformations" proposed according to the invention are very easy to record, or tabulate, in memory cards (an LUT standing for LOOK-UP-TABLE).

Nevertheless, by means of the method according to the invention, the user obtains a reconstructed target image which, in relation to an image which would be obtained directly with a real camera, exhibits small geometrical differences.

However, it was apparent on usage, during tests presented to observers who were not aware of the means by which the image shown to them had been obtained, that the target images reconstructed according to the invention found as much favor with the tested observers as had the images obtained by means of a real camera having the same orientation and zoom as the target images under test obtained according to the invention. The observers do not have a negative perception of the very small geometrical differences introduced during the calculations of the target image according to the invention, and find, on the contrary that the image is of high quality. Even apprised observers have some difficulty in detecting the differences which exist between the two kinds of images, real or reconstructed.

This is a great advantage, since the method according to the invention can be implemented by means of a small number of simple modules in which the calculations are carried out very readily. Hence, a device formed from these modules for implementing the method is extremely easy to manufacture, is of exceptionally low cost as compared with devices incorporating commercial "transform chips", and provides an image of attractive quality.

BRIEF DESCRIPTION OF THE DRAWINGS

The invention is described below in detail with reference to the appended diagrammatic figures in which:

FIG. 2 represents the source image, in perspective, in an individual orthonormal frame with the same origin as the absolute frame;

FIG. 3A represents the projection of the source image in one of the planes of this individual frame, and FIG. 3B represents the source image parallel to another plane of this individual frame;

FIG. 6A represents the projection of the source image in a vertical plane of the absolute frame containing the optical axis of this source image, and FIG. 6B represents the projection of this source image in the horizontal plane of this absolute frame;

FIG. 7A represents the projection of the target image in a vertical plane of the absolute frame containing the optical axis of this target image, and FIG. 7B represents the projections of this target image in the horizontal plane of this absolute frame;

DETAILED DESCRIPTION OF THE PREFERRED EMBODIMENT

A/ Definition of the problem solved by the invention.
A1/ Account of the geometrical data of the problem.

Figure 1A:
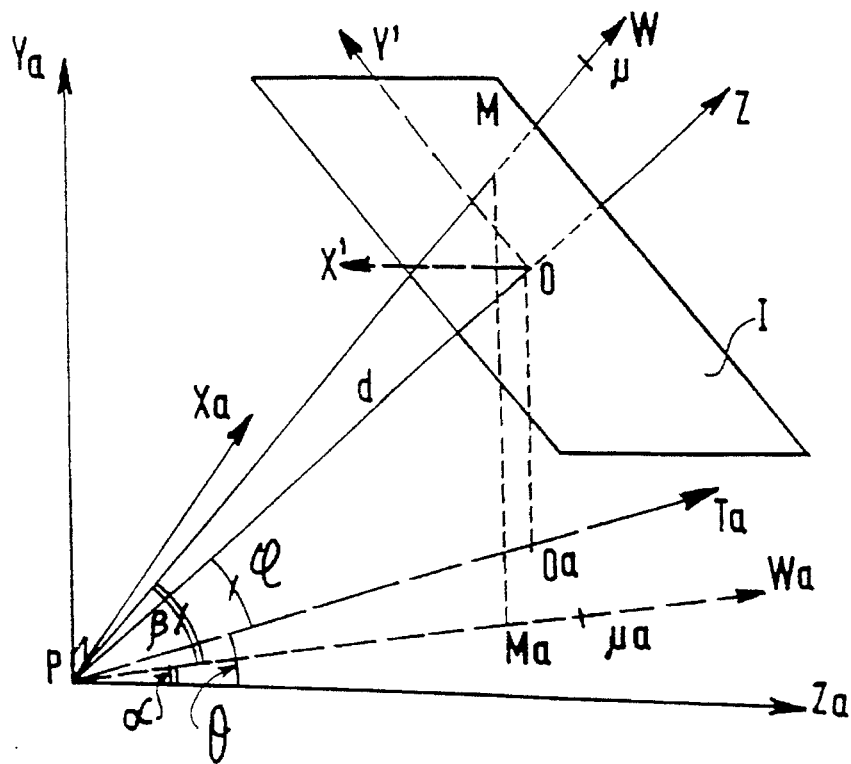
FIG. 1A represents a so-called source image, in perspective, in a fixed orthonormal three-dimensional frame termed the absolute frame, together with the spherical coordinates of its center and of a current point.
Figure 1B:
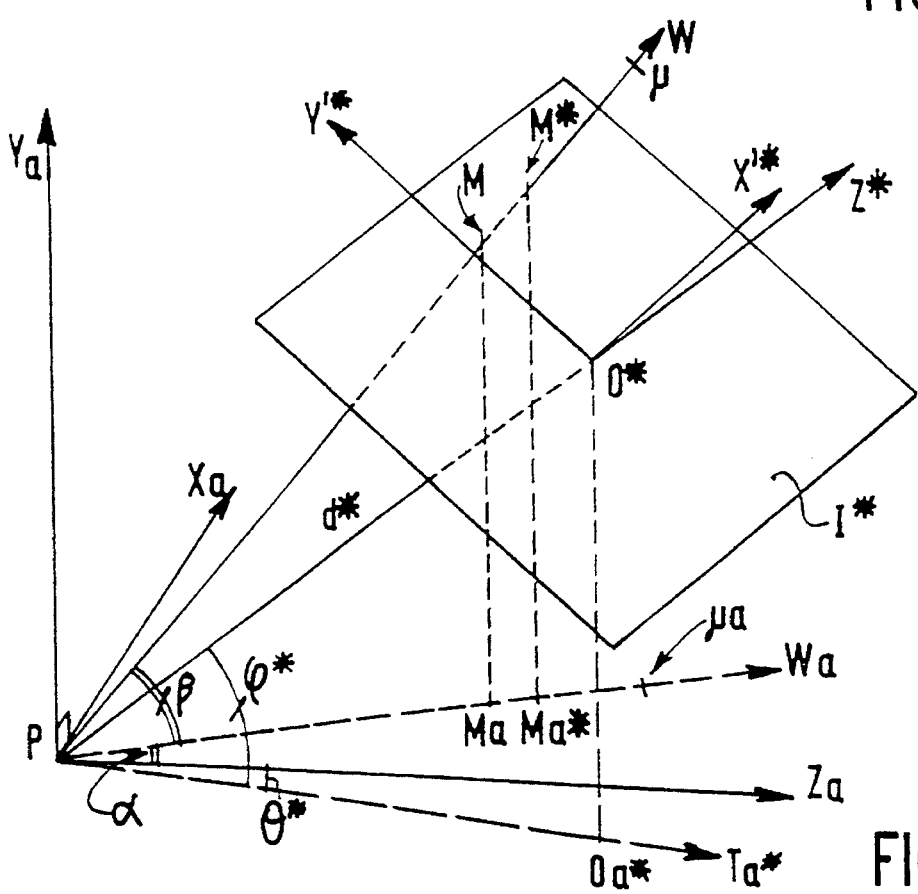
FIG. 1B represents a so-called target image, in perspective, in the same absolute frame, together with the spherical coordinates of its center and of a current pixel.

Referring to FIGS. 1A and 1B, (PXa, PYa, PZa) designates a fixed three-dimensional orthonormal frame, labelled the "absolute frame", with origin P, which will serve as reference in 3-dimensional space throughout the account which follows.

The plane (PXa, PZa) will hereafter be called the "horizontal plane". The axis PYa is therefore perpendicular to the said horizontal plane. This axis will hereafter be called the "vertical axis". Any plane containing this axis PYa will also be called a "vertical plane".

Referring to FIG. 1A and FIG. 2, we denote by I a digital plane starting image, labelled "source image" I, formed optically, that is to say, having an optical center P and an optical axis PZ which intersects the plane of the source image I at a point O. This point O is the geometrical center of the source image I, and the optical axis PZ is perpendicular to the source image I at O.

In FIG. 2, the optical center P, also called the "view point", is defined as the point such that every light ray Pμ, issuing from a luminous object point μ in space and stemming from this view point P, passes through the optic which gives rise to the digital source image, without deviation. Let us consider therefore an object point μ in space having its image at a point M in the digital source image I, and let P be the view point corresponding to this digital image, then it follows from the properties of the view point P that the points μ, M, P are in line, and that the light ray Pμ is straight.

The account which follows will treat the simple case in which the digital source image I is square or rectangular. The person skilled in the art will readily be able to generalize the invention to other digital images.

Digital image is understood to mean an image formed from pixels each assigned a luminance level Q. The luminance level can be marked off, for example, on a scale of luminance levels graduated from 1 to 256. The most luminous or lightest pixels are assigned the largest luminance levels, and the least luminous pixels, or dark pixels, are assigned the smallest luminance levels on this scale.

Referring to FIG. 2 and FIGS. 3A and 3B, the source image I is furnished with a three-dimensional, orthonormal individual frame (PX, PY, PZ) which is tied to this particular image I. The origin of the individual frame (PX, PY, PZ) is chosen at the view point P of the source image I, the optical axis PZ of the source image I is one of the axes of the frame. This individual frame is labelled the "source frame".

In FIG. 3A, the plane (PZ, PX) of the source individual frame is merged with the plane of the sheet of the drawing. The source image I, which is perpendicular to the axis PZ, is represented by a segment. The axis PY is perpendicular to the plane of the sheet of the drawing. The magnitude d=PO is labelled the "scale factor of the source image".

In FIG. 3B, the plane (PX, PY) of the source individual frame is parallel to the plane of the sheet of the drawing, and the source image I, here square, is represented in this plane. The axis PZ is perpendicular to this plane at O. The axes PX, PY of the source individual frame have projections OX', OY' in the source image plane; the axes PX, PY, and hence their projections OX', OY' are chosen respectively parallel to the rows and columns of pixels of the digitized source image I. The geometrical center O is chosen to coincide with a pixel.

Referring to FIG. 3B, every point M of the source image I has as projections in the frame OX', OY', respectively, points M' and M", such that:

MM'=Y and

MM"=X.

Thus, every point M of the source image I has coordinates:

M→(X, Y) in the frame (OX', OY')

and

M→(X, Y, d) in the source frame (PX, PY, PZ).

Figure 4A:
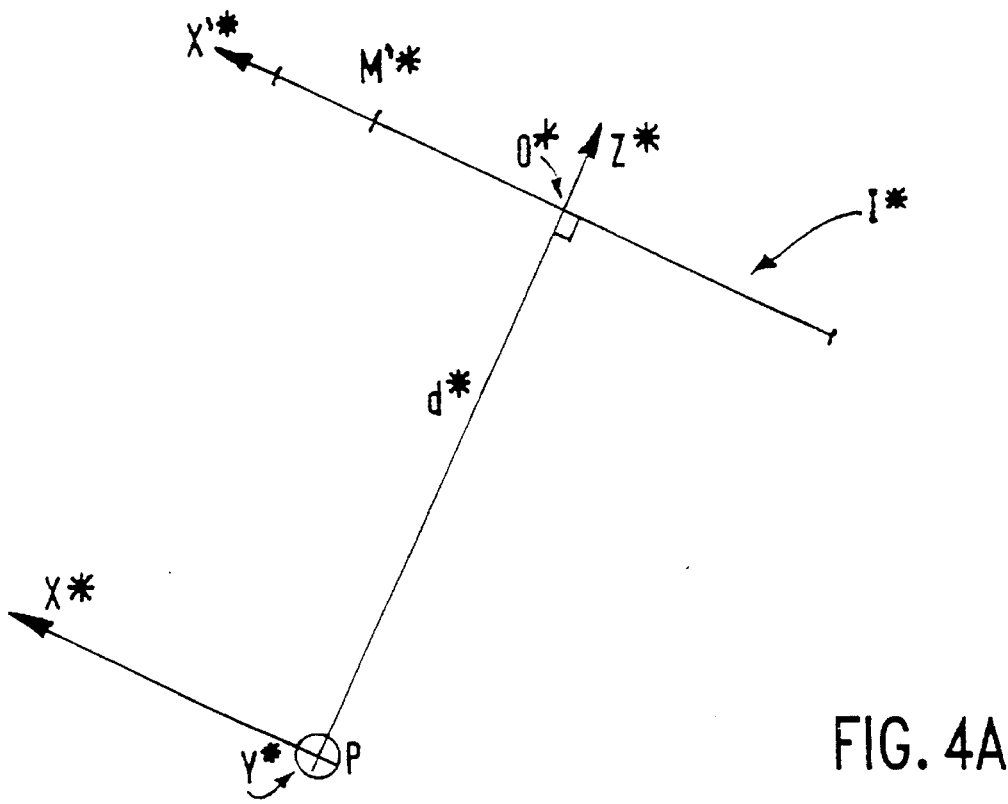
FIG. 4A represents the projection of the target image in a plane of its individual orthonormal frame.
Figure 4B:
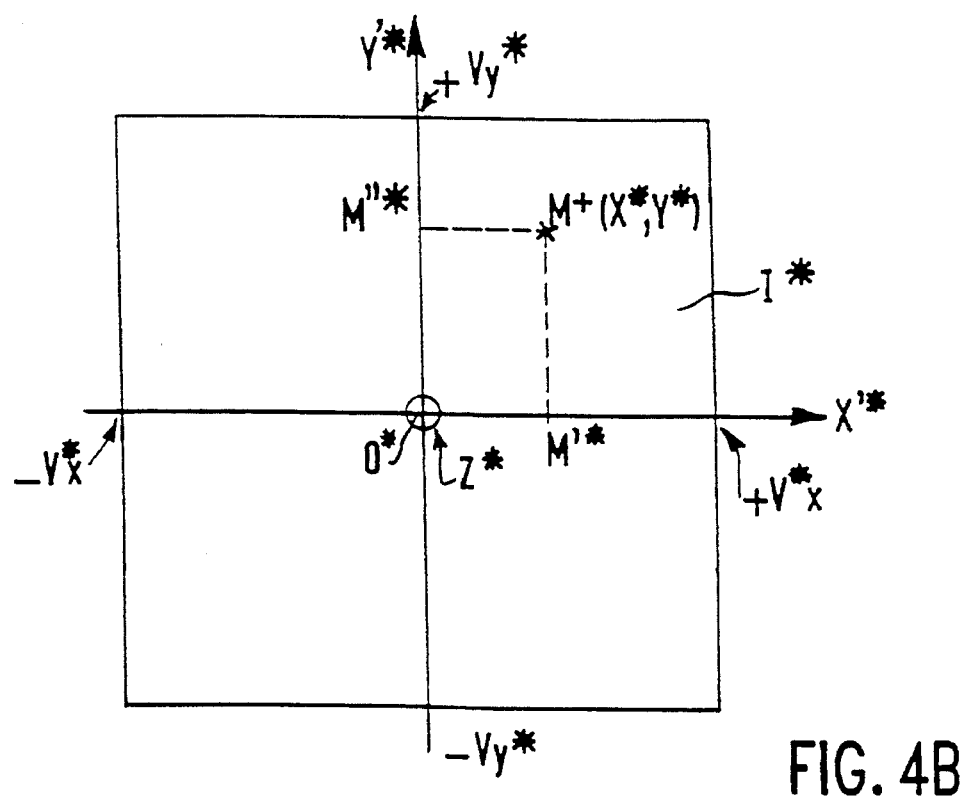
FIG. 4B represents the target image parallel to another plane of its individual frame.

Referring to FIGS. 1B, 4A and 4B, another image plane is moreover determined in 3-dimensional space, labelled the "target image plane", and denoted by I* (I star). This target image I* is a digital image chosen, for the purposes of simplifying the account, to have the same geometrical shape as the source image I, that is to say square or rectangular. Moreover, this target image is also associated with an optical center or view point, and with an optical axis passing through this view point.

By assumption, referring to FIGS. 1B and 2B, matters are fixed such that the view point of the target image I* is the point P, that is to say that the view points of the source image I and target image I* are merged. PZ* denotes the optical axis of the target image I* which intersects the plane of this target image I* at a point O*. This point O* is the geometrical center of the target image I* and the optical axis PZ* is perpendicular to the plane of the target image I*, at O*.

The view point P has the same properties in relation to the formation of the target image I* as to the source image I, that is to say, that the image point M* in I* of an object point μ in space lies at the intersection of the light ray Pμ and of the target image plane I*, and that the points PM*μ are aligned with the straight lightray Pμ.

Referring to FIGS. 4A and 4B, the target image I* is furnished with a three-dimensional orthonormal individual frame (PX*, PY*, PZ*) which is tied to this particular target image I*. The origin of the individual frame (PX*, PY*, PZ*) is chosen at the common view point P of the source image I and target image I*; and the optical axis PZ* of the target image I* is one of the axes of this frame. The individual frame is labelled the "target frame".

In FIG. 4A, the plane (PZ*, PX*) of the target frame is merged with the plane of the sheet of the drawing. The target image I*, which is perpendicular to the axis PZ*, is represented by a segment. The axis PY* is perpendicular to the plane of the sheet of the drawing. The magnitude d*=PO* is labelled the "scale factor of the target image".

In FIG. 4B, the plane (PX*, PY*) of the target individual frame is parallel to the plane of the sheet of the drawing, and the target image I*, here square like the source image I, is represented in this plane. The axis PZ* is perpendicular to this plane at O*. The axes PX* and PY* of the target frame have projections O*X'* and O*Y'* in the target image plane; the axes PX*, PY* and hence their projections O*X'*, O*Y'* are chosen respectively parallel to the rows and columns of pixels of the digital target image. The geometrical center O* is chosen to coincide with a pixel.

Referring to FIG. 4B, every pixel M* of the target image has as projections, in the frame (O*X'*, O*Y'*), respectively the points M'* and M"*. Thus, every pixel M* of the target image I* has coordinates:

M*→(X*, Y*) in the frame (O*X'*, O*,Y'*), and

M*→(X*, Y*, d*) in the target frame (PX*, PY*, PZ*).

Referring to FIGS. 1A and 1B, by assumption matters are also fixed such that the view points of every source image and target image are merged with the origin P of the absolute frame (PXa, PYa, PZa).

Referring to FIG. 1A, it is possible to define the angular parameters which relate the individual frame of the source image I to the absolute frame. FIG. 1A represents the source image plane I in perspective, in 3-dimensional space, furnished with the frame (OX', OY') in its plane, its geometrical center O being situated at the distance d (or source scale factor) from the absolute origin (or common view point) P, and furthermore represents the three axes (PXa, PYa, PZa) of this absolute frame. The axis PZa is the "reference origin axis" in the horizontal plane (PZa, PXa).

As seen earlier, the source optical axis PZ is projected at PTa onto the horizontal plane (PXa, PZa). This projection is effected parallel to the vertical axis PYa. In this operation, the projection of the geometrical center O is Oa. The plane (PZ, PTa) is a "vertical plane".

This projection operation defines two angles which link the source individual frame (PX, PY, PZ) to the absolute frame (PXa, PYa, PZa). These two angles are:

the tilting angle φ which is the angle by which the source optical axis PZ must be rotated vertically to bring it into the horizontal plane (PXa, PZa) at PTa, and the panning angle θ which is the angle by which the projection PTa must be rotated horizontally to bring it onto the reference origin axis PZa.

In FIG. 6A, which represents the vertical plane (PYa, PTa), I is the locus of the source image, PZ is the optical axis, O is the geometrical center of the source image, and d is the source scale factor. Thus:

the tilting angle φ is marked by the angle (PZ, PTa).

In FIG. 6B, which represents the horizontal plane (PZa, PXa), the panning angle θ is marked by the angle (PTa, PZa).

If, in FIG. 1A, the source plane I is replaced by the target plane I*, it is possible similarly to define the tilting angle φ* and panning angle θ* which relate the target individual frame to the absolute frame.

Thus, referring to FIG. 1B, it is possible to define the angular parameters which relate the individual frame of the target image I* to the absolute frame. FIG. 1B represents the target image plane I* in perspective, in 3-dimensional space, furnished with the frame (OX'*, OY'*) in its plane, its geometrical center O* being situated at the distance d* (or target scale factor) from the absolute origin (or common view point) P, and furthermore represents the three axes (PXa, PYa, PZa) of this absolute frame.

The target optical axis PZ* is projected at PTa* onto the horizontal plane (PXa, PZa). This projection is effected parallel to the vertical axis PYa. In this operation, the projection of the geometrical center O* is Oa*. The plane (PZ, PTa) is a "vertical plane".

This projection operation defines two angles which link the source individual frame (PX*, PY*, PZ*) to the absolute frame (PXa, PYa, PZa). These two angles are:

the tilting angle φ* which is the angle by which the target optical axis PZ* must be rotated vertically to bring it into the horizontal plane (PXa, PZa) at PTa*, and the panning angle θ* which is the angle by which the projection PTa* must be rotated horizontally to bring it onto the reference origin axis PZa.

In FIG. 7A, which represents the vertical plane (PYa, PTa), I* is the locus of the target image, PZ* is the optical axis, O* is the geometrical center of the target image, and d* is the target scale factor. Thus:

the tilting angle φ* is marked by the angle (PZ*, PTa*).

In FIG. 7B, which represents the horizontal plane (PZa, PXa), Ia* is the orthogonal projection of the target image I*, Oa* the projection of O*, PTa* is the projection of the optical axis PZ*. Thus:

the panning angle θ* is marked by the angle (PTa*, PZa).

Figure 5A:
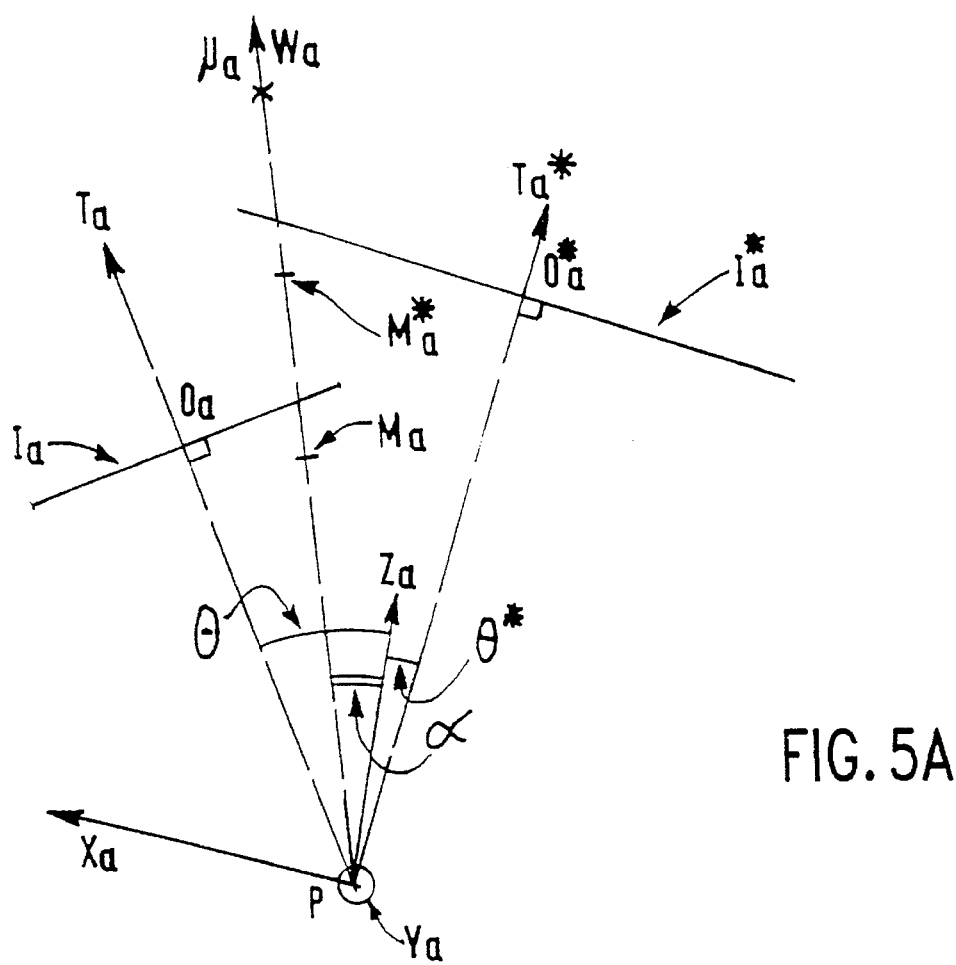
FIG. 5A represents the projections of the source and target images in the so-called horizontal plane of the absolute frame.

In FIG. 5A, which is represented in the "horizontal plane" (PZa, PXa) of the absolute frame, the segments Ia and Ia* are the projections of the source image plane I and target image plane I*, respectively, and the axes PTa and PTa* are the projections of the optical axes PZ and PZ* described earlier when referring to FIGS. 1A and 1B and to FIGS. 6A, 6B, 7A and 7B. Thus:

the source panning angle is θ=(PTa, PZa), the target panning angle is θ*=(PTa*, PZa).

A2/ Account of the objectives of the invention.

The objective of the invention is to provide a method for constructing a target image I* from a source image I, using a geometrical transformation which takes note of the changes of angles in order to pass:

from the source panning angle θ to the target panning angle θ*, from the source tilting angle φ to the target tilting angle φ*, and which takes note of the change of scale in order to pass from the scale factor d to the scale factor d*.

Construction of the target image is effected by allocating a luminance level Q to each pixel M* of the target image characterized by its parameters φ*, θ*, d*. This luminance level must be sought at the point M of the source image which is the image of the same object point μ of 3-dimensional space within a scene to be filmed.

Given the fact that the target image I* is chosen so as to have the same view point P as the source image, and given the properties of the common view point, it follows that the source M and target M* image points are aligned with the same straight light ray Pμ.

Thus, starting from the assumption that the coordinates (X*, Y*) of a point M* of the target image I* whose luminance level Q is sought are known in its individual frame (PX*, PY*, PZ*), the method according to the present invention comprises the determination of the coordinates (X, Y) of the corresponding point M of the source image I in its individual frame (PX, PY, PZ).

Then, knowing the position of this point M in the source image I, the method according to the present invention then comprises the determination of the luminance function Q(X, Y) linked to this point M of the source image.

Next, knowing the luminance function Q(X,Y) tied to the point M of the source image, the method according to the present invention comprises the determination of a luminance function Q*(X*,Y*) which must be assigned to the point M* of the target image to be constructed.

Having, now, the data consisting of a luminance function for each point of the target image, the method according to the present invention then makes it possible to construct the target image. In the whole of the image processing method, the source image is defined by a first series of parameters in relation to an absolute frame in three-dimensional space, and the target image is defined by a second series of parameters in relation to the said absolute frame. These parameters are the panning angles θ, θ* and tilting angles φ, φ* which link each individual frame to the absolute frame, as well as the scale factors d and d* relating to each source or target image plane.

Reconstruction of the target image is based on the fact that the corresponding points M in the source image and M* in the target image are image points of a same object point μ in three-dimensional space. In an exact calculation, these points are situated on a same straight light ray Pμ which stems from the view point P common to the two images I and I* and passes through the object point μ.

B/ Description of the methOd according to the invention.

B1/ Definition of geometrical functions termed perspective transformation functions.

In order to match up a pixel in the target image with a point of the source image, the image of the same point μ in space situated on a light ray Pμ stemming from the common view point P, it is necessary to determine perspective transformation functions which will enable the coordinates of each point of a source or target plane to be related to this light ray Pμ passing through this object point μ in space and the view point P.

These perspective transformation functions are charged with establishing the relation between:

the luminance function $Q^*(X^*,Y^*)$ (1a)

relating to the pixel M* of the target image I*, and the luminance function $Q(X,Y)$ (1b)

relating to the corresponding point M of the source image I. This correspondance is established when the following equality holds:

$$Q^*(X^*,Y^*)=Q(X,Y) \quad (2)$$

In order to solve this problem, we define:
a first function F such that:

$$(X,Y)=F(\alpha,\beta) \quad (3a)$$

and a second function G such that:

$$(X^*,Y^*)=G(\alpha,\beta) \tag{3b}$$

The parameters $\alpha$ and $\beta$ are angular parameters which will be defined further on. Once these angular parameters $\alpha$ and $\beta$ have been defined, the term (1a) in relation (2) can be written as a function of $\alpha$ and $\beta$ by means of the first function F, as below:

$$Q(X,Y)=Q[F(\alpha,\beta)] \tag{4a}$$

From the relation (3b) we deduce that $$(\alpha,\beta)=G^{-1}(X^*,Y^*) \tag{5}$$

This relation (5) applied to relation (4a) makes it possible to deduce that:

$$Q(X,Y)=Q[F(G^{-1}(X^*,Y^*)] \tag{4b}$$

Expression (2) is next written out by replacing its term (1b) by the expression (4b). It follows that:

$$Q^*(X^*,Y^*)=Q[F(G^{-1}(X^*,Y^*))] \tag{5a}$$

The right-hand side of equation (5a) is a composition of three functions which can be written using the mathematical sign for function composition:

o (read as "ring").

Equation (5a) can therefore be written:

$$Q^*(X^*,Y^*)=Qo\ Fo\ G^{-1}(X^*,Y^*) \tag{5b}$$

or more conveniently:

$$Q^*=Qo\ Fo\ G^{-1} \tag{6}$$

(read as Q star equals Q ring F ting G to the minus one).

In equation (6) the functions $Q^*$ and $Q$ are luminance functions and the functions F and $G^{-1}$ are perspective transformation functions.

It was already mentioned, in the introductory section of the description of the invention, that the state of the known art taught perspective transformation functions which could certainly lead to an "exact" construction of the target image through the processing of the source image, but that this exactness in construction was achieved at the price of using means which are very difficult to implement, within the context of constraints which are highly incompatible with the problem to be solved, and are moreover expensive.

The present invention aims at determining perspective transformation functions F and $G^{-1}$ which exhibit the following properties:

a) these functions, without allowing "strictly exact construction" of the target image from the source image, nevertheless provide a construction of the target image which takes note of the approximations such that an apprised observer may regard this construction as "reasonably and sufficiently faithful", and that, generally, a non-specialist and non-forewarned observer cannot differentiate a target image constructed according to the invention from a target image constructed in a "strictly exact" manner.

b) these functions can be implemented by simple and inexpensive means.

c) these functions when implemented make it possible to achieve the construction of the target image in real time, this solving the technical problem set out in the introductory section of this description.

According to the invention, these two functions F and $G^{-1}$ are therefore defined first.

B2/ Determination of the perspective geometrical transformation function $G^{-1}$ according to the invention.

Figure 5B:
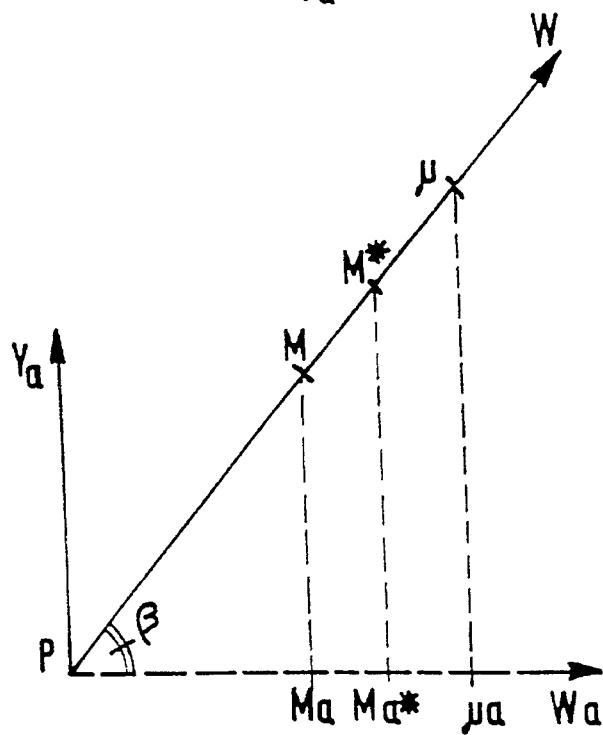
FIG. 5B represents, in the absolute frame, a vertical plane which contains the light ray with which are aligned the luminous source point, the target image pixel, the source image point, and the origin of the absolute frame.

Referring to FIG. 1B, as also shown moreover in FIG. 5B and FIG. 7B, a light ray $P\mu$ passing through the pixel $M^*$ of the target image $I^*$ is projected orthogonally at $P\mu a$ onto the horizontal plane (PZa, PXa) of the absolute frame.

In this projection, the plane ($P\mu$, $P\mu a$) is a vertical plane, and the point $Ma^*$ is the projection, on $P\mu a$, of the pixel $M^*$ of $P\mu$, this projection being parallel to the vertical axis PYa.

Hence, once the coordinates $(X^*, Y^*)$ of a given pixel $M^*$ of the target image are known, we seek to determine the spherical coordinates defining the light ray $P\mu$ passing through this point $M^*$.

These spherical coordinates tied to the ray $P\mu$ are:

the angle $\alpha=(PZa, P\mu xa)$ in the horizontal plane, the angle $\beta=(P\mu, P\mu a)$ in a vertical plane.

These angles fully define the position of the light ray $P\mu$ in the absolute frame, and hence in 3-dimensional space.

To illustrate the definition of the angle $\alpha$, FIG. 5A represents the horizontal plane (PZa, PXa) in which:

the axis $P\mu a$ is the projection of the light ray $P\mu$, the points $\mu a$, $Ma^*$, $Ma$ respectively are the projections of the points $\mu$, $M^*$ and M and are aligned with $P\mu a$, the angle $\alpha=(PZa, P\mu a)$ is the angle between the projection $P\mu a$ of the light ray $P\mu$ and the reference axis PZa of the absolute frame in the horizontal plane.

To illustrate the definition of the angle $\beta$, FIG. 5B represents the vertical plane (PYa, $P\mu a$), in which:

the axis $P\mu$ is the light ray with which are aligned the object point $\mu$ in space and the point M of the source image, as well as the pixel $M^*$ of the target image, the axis $P\mu a$ is the projection $P\mu$ on the horizontal plane, the points $Ma$, $Ma^*$, $\mu a$ are, respectively, the projection of the source image point M, target image point $M^*$ and object point $\mu$ in space, the angle $\beta=(P\mu a, P\mu)$ is the angle between the light ray $P\mu$ and its projection $P\mu a$ on the horizontal plane.

Relations will be chosen hereafter in order to link these spherical coordinates $\alpha,\beta$ (or angles $\alpha,\beta$) considered in the absolute frame, to the coordinates $X^*, Y^*$ considered in the individual frame of the target image $I^*$.

In order to determine the geometrical function $G^{-1}$, according to the invention, the angular parameters $\alpha$, $\beta$ are chosen as "linear functions" of the coordinates $X^*, Y^*$ of the current pixel $M^*$.

For this purpose, we write:

$$\alpha=a_\theta \cdot X^*+b_\theta \tag{7a}$$

$$\beta=a_\varphi \cdot Y^*+b_\varphi \tag{7b}$$

It should be clearly noted that the choice of linear relations in order to define the angles $\alpha$, $\beta$ leads, from now on, to the consideration of a new light ray PW passing APPROXIMATELY through the pixel $M^*$ $(X^*, Y^*)$ of the target image, rather than the real light ray $P\mu$ passing exactly through this pixel $M^*$ $(X^*, Y^*)$. It is the choice of this approximation which will imply, as was stated earlier, that the reconstructed image is not "exact" as in the state of the art, but "approximate". Nevertheless, the reconstructed image according to the invention, with the requisite change of perspective, has characteristics very like an "exact" image whose image aberrations are moreover corrected so far as possible. In the approximation according to the invention, it is therefore assumed that the light ray PW, which is projected at PWa onto the horizontal plane, is approximately merged with the real light ray Pµ, and has spherical coordinates (α, β) defined by the linear relations (7a), (7b). The projections PWa, Pµa of the rays PW, Pµ are assumed likewise to be approximately merged.

In these linear relations (7a) and (7b), the parameters $a_θ$, $b_θ$ and $a_φ$, $b_φ$ depend solely on the panning angle θ* and tilting angle φ*, as well as on the scale factor d*, that is to say on the position of the target image I* in the absolute frame.

Referring to FIG. 4B, the dimensions of the target image are $2V_x*$ parallel to the axis O*X'*, and $2V_y*$ parallel to the axis O*Y'*. (In the particular case of FIG. 4B, $V_x*=V_y*$). The dimensions $V_x*$ and $V_y*$ are expressed in numbers of pixels, that is to say that:

$X*ϵ[-V_x*, Vx*]$ in the angular interval $[-Δθ*, +Δθ*]$ $Y*ϵ[-V_y*, V_y*]$ in the angular interval $[-Δφ*, +Δφ*]$ It is noted, in FIG. 7B, that when:

$X*=0$, it follows that α+θ*

$X*=±V_x*$ it follows that α=θ*±Δθ* which means that:

$$α=(Δθ*/V_x*)X*+θ* \quad (8a)$$

We define $D_x*$ equal to the number of pixels in the image I* per radian parallel to $V_x*$. It is thus possible to write:

$(V_x*/Δθ*)=D_x*$

Hence we obtain:

$$α=(1/D_x*)X*+θ* \quad (9a)$$

On comparing relation (7a) and relation (9a) term by term we obtain:

$a_θ=(1/D_x*)$ $b_θ=θ*$

Those skilled in the art will similarly calculate straightforwardly that:

$$β=(Δφ*/V_y*)Y*+φ* \quad (8b)$$

Hence, on putting $D_y*=V_y*/Δφ*$ we obtain:

$a_φ=1/D_y*$ $b_φ=φ*$ and $$β=(1/D_y*)Y*+φ* \quad (9b)$$

We have therefore determined simple linear relations linking each pixel M* of the target image I* to a light ray PW which is an approximation of the real ray Pµ on which M* is situated.

These relations:

$$α=(1/D_x*)X*+θ* \quad (9a)$$

$$β=(1/D_y*)Y*+φ* \quad (9b)$$

enable a person skilled in the art to determine the function $G^{-1}$ of relation (5) as sought:

$$(α, β)=G^{-1}(X*, Y*) \quad (5)$$

This function $G^{-1}$ makes it possible to calculate the spherical coordinates (α, β) of the approximate light ray PW* which was chosen for linking to a given pixel M* (X*, Y*) of the target image I*, once the angles φ*, θ* and the number of pixels per radian $D_x*$, $D_y*$ of this image are known.

The parameters $D_x*$, $D_y*$ are termed the "resolution" of the target image and are functions of the target scale factor d* and of the framing of the target image $V_x*$, $V_y*$. Indeed, referring to FIGS. 7A and 7B, it is apparent that:

$\tan Δθ=V_x*/POa*$ $POa*=d*.\cos φ*$ hence $D_x*=(1/V_x*) \text{Arctan} (V_x*/d*.\cos φ*)$ moreover:

$\tan Δφ*=V_y*/d*$ hence $D_y*=(1/V_y*) \text{Arctan} (V_y*/d*)$

Therefore, this function $G^{-1}$ comprises the parameters θ*, φ* and d* which can vary continuously at the decree of a user. However, according to the invention this function has been chosen to be sufficiently simple to be calculable in real time while still providing a correct reconstructed image as will be seen subsequently.

B3/ Calculation of the geometrical function F for perspective transformation according to the invention.

It is now necessary, from a knowledge of the spherical coordinates (α, β) of the approximate light ray chosen, to determine the coordinates (X, Y) of the point M of the source image I, in its individual frame, this point M being situated on the same light ray PW approximately merged with the exact light ray Pµ.

Referring to FIG. 2, which represents in perspective the source plane I in its individual frame (PX, PY, PZ), a point M is completely defined by knowing:

the angle Â=(PM', PO)

the angle B=(PM, PM')

where M' is the projection of M onto the axis X' in the plane of the source image I, and the scale factor d=PO which is the distance between the common view point P, serving as absolute origin, and the point O the geometrical center of the image I.

Now, we saw earlier, when referring to FIG. 3B, that: MM'=Y and MM"=X

Referring to FIG. 2, we calculate:

$$X=d. \tan A. \quad (10a)$$

$$Y=d. \tan B/\cos A \quad (10b)$$

Referring to this FIG. 2, we now seek to define the point M in the absolute frame rather than merely in its individual frame.

In connection with FIG. 1A, we pass from the individual frame to the absolute frame by applying successively a rotation φ(TILTING) and a rotation θ(PANNING) to the optical axis PZ of the source image plane in order to bring it onto the axis PZa of the absolute frame.

We can therefore write out the following change of frame formulae $$\begin{bmatrix} \cos B \cdot \sin A \\ \cos B \cdot \cos A \\ \sin B \end{bmatrix} =$$

$$\begin{bmatrix} 1 & 0 & 0 \\ 0 & \cos\phi & -\sin\phi \\ 0 & \sin\phi & \cos\phi \end{bmatrix} \begin{bmatrix} \cos\theta & -\sin\theta & 0 \\ \sin\theta & \cos\theta & 0 \\ 0 & 0 & 1 \end{bmatrix} \begin{bmatrix} \cos\beta \cdot \sin\alpha \\ \cos\beta \cdot \cos\alpha \\ \sin\beta \end{bmatrix}$$

whence, after calculation we obtain:

$$A = \arctan\left( \frac{\cos\beta \cdot \sin(\alpha - \theta)}{\cos\beta \cdot \cos(\alpha - \theta) \cdot \cos\phi - \sin\beta \sin\phi} \right) \quad (11a)$$

$$B = \arctan(\cos\beta \cdot \cos(\alpha - \theta)\sin\phi + \sin\beta\cos\alpha) \quad (11b)$$

Combining relations (3a) and relations (10a), (10b) leads to the sought-after relation F between (X,Y) and (α, β). This relation is exact and hence complicated, but it should be noted that it depends only on the parameters θ and φ of the source image which are fixed and known A PRIORI, and on the pairs (α, β). By settling A PRIORI upon a definite number of pairs (α, β), the function F can be tabulated and thus the difficulty in the calculations due to the complexity of the function F can be sidestepped. It will also be possible to take note of the distortions of the objectives within the tabulated function. The greater the number of pairs (α, β) allowed for A PRIORI, the higher the precision in the determination of the points M(X,Y).

B4/ Image processing method for the construction of the target image by means of the geometrical functions F and $G^{-1}$.

The user defines the parameters of the target image I* which he wishes to construct. These parameters are the panning angle θ*, the tilting angle φ* and the scale factor d*.

According to the invention, the image processing method for the construction of the target image I* includes firstly the defining of the coordinates (X*, Y*) of each pixel M* of this target image I*. Then, for each of the pixels:

M* (X*, Y*)

this method applies the function $G^{-1}$ defined by:

$$(\alpha, \beta) = G^{-1} (X^*, Y^*) \quad (5)$$

in which:

$$\alpha = (1/D_x^*)X^* + \theta^* \quad (9a)$$

$$\beta = (1/D_y^*)Y^* + \phi^* \quad (9b)$$

Application of the geometrical perspective transformation function $G^{-1}$(5) therefore makes it possible, starting from the coordinates of a given pixel M*, in the individual frame of the target image I*, to calculate, in a simplified way, the spherical coordinates (α, β) of the straight light ray PW which passes approximately through this pixel M* and through the view point P common to all the images and which is moreover the origin of the absolute frame within which the angles α, β are measured.

Once the spherical coordinates (α, β) of the approximate light ray PW have been calculated, the image processing method includes, for each pair of spherical coordinates (α, β) defined in the absolute frame, a search, within a table, for the coordinates (X, Y) of a point M of the source image, situated at the intersection of the approximate light ray PW with this source image I, these coordinates (X,Y) being measured in the individual frame of this source image.

For this purpose, in an initial step a definite number of pairs of spherical coordinates (α, β) is specified and labelled $(\alpha_o, \beta_o)$, and the pair of coordinates (X,Y) is calculated for each given pair $(\alpha_o, \beta_o)$ by applying the geometrical perspective transformation function F $$(X, Y) = F (\alpha_o, \beta_o) \quad (3a)$$

with $$X = d \cdot \tan A \quad (10a)$$

$$Y = d \cdot \tan B / \cos A \quad (10b)$$

relations in which the intermediate parameters A and B are trigonometric functions (11a) and (11b) of the spherical coordinates $(\alpha_o, \beta_o)$, involving the parameters of the source image I, namely, the panning angle θ and the tilting angle φ. For each pair $(\alpha_o, \beta_o)$, the coordinates X and Y of the point M are therefore pure functions of the scale factor d of the source image and of the angles θ and φ, values which are known A PRIORI in this image processing method. Consequently, in the initial step, pairs $(\alpha_o, \beta_o)$ are given and then the corresponding pairs of coordinates (X,Y) are calculated and stored in a table at the addresses $(\alpha_o, \beta_o)$.

The table is used by matching each pair (α,β), calculated by means of $G^{-1}$, with an address $(\alpha_o, \beta_o)$ of the table, to within the resolution of the table. At this address there is a pair of coordinates (X,Y), precalculated and stored, and which is read.

Having, now, the coordinates of the point M of the source image which best match the pixel M* of the target image I*, the method includes the determination, possibly by interpolation, of the value of the luminance level at this point M and next the transferring of this luminance level to the pixel M* of the target image to be constructed.

These operations are repeated for each pixel of the target image until the entire target image is constructed.

When the user chooses new parameters φ*, θ* and d* for the target image, a new target image is constructed, the source image remaining at an unchanged position in 3-dimensional space with parameters θ, φ and d unchanged.

Under the variations in position and in scale factor of the target image, which are prescribed by the user, this target image nevertheless retains its common view point with the source image.

C/ Image processing device for implementing the geometrical functions F and $G^{-1}$.

Figure 13:
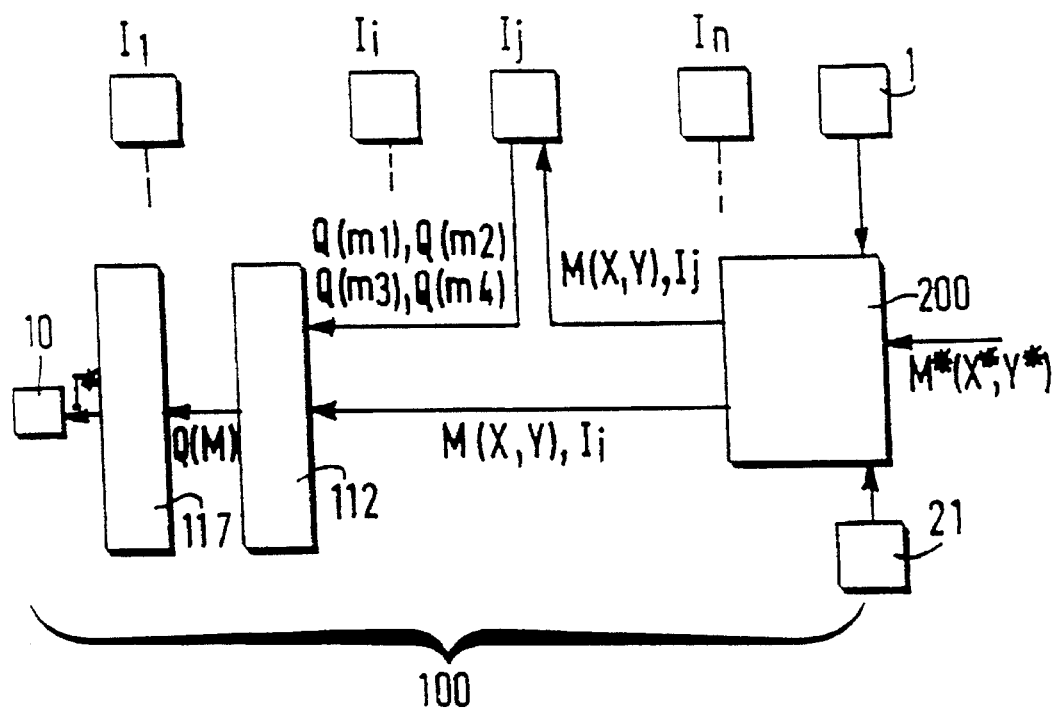
FIG. 13 represents as functional blocks a diagram of an image processing device of the address calculator type according to the invention.

FIG. 13 represents, as functional blocks, an image processing device 200 for constructing a target image I* from a source image I by implementing the geometrical perspective transformation functions $G^{-1}$ and F defined earlier. In general, hereafter this device will be called the "address calculator", referenced 200, since it is charged with calculating, from the address (X*,Y*) of a pixel M* in the target image I*, the address (X,Y) of the corresponding point M in the source image I.

In FIG. 13, the block 210 is a memory block which stores the parameters φ*, θ* and d* which are chosen by the user in order to construct the target image I* in real time, (that is to say, around 20 images per second), with or without change of parameters of the target image. The block 201 is a block which defines the framing of the target image I*, that is to say, the parameters $V_x^*$ and $V_y^*$ from the parameters chosen by the user. Block 113 is an address generator which provides, in the individual frame of the target image, the various addresses (X*,Y*) of each of the pixels M*, of this target image I*, and hence one address for each pixel.

Block 220 receives the data from blocks 113 and 210. The function $G^{-1}$ is implemented in block 220.

Blocks 113, 201 and 210 are, for example, memory areas. The connections between blocks 113, 201 and 210 are systems for access to these memories.

Figure 8:
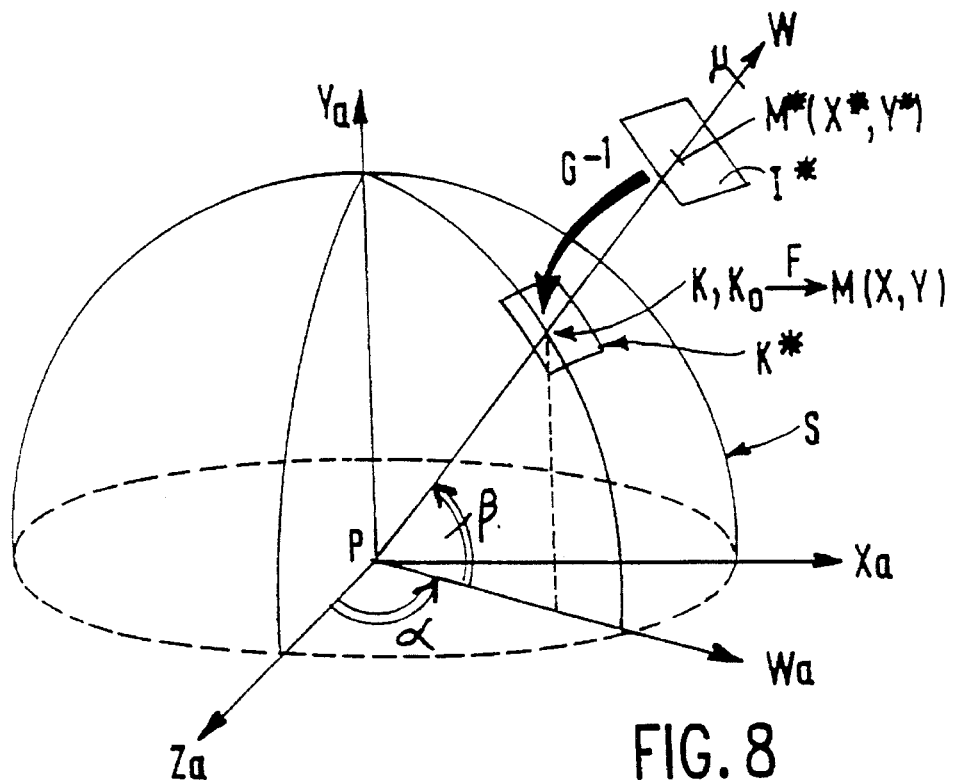
FIG. 8 illustrates the action of the perspective geometrical transformation functions $G^{-1}$ and F in passing from the coordinates of a current pixel of the target image in its individual frame, to the spherical coordinates of the light ray passing through this pixel and the absolute origin merged with the common viewpoints of the source and target images, and then in passing to the coordinates of the corresponding point of the source image in its individual frame.

FIG. 8 illustrates the way in which the functions $G^{-1}$ and F are used in the address calculator 200.

To each pair (X*, Y*) provided by block 113, there corresponds, as a function of the angles θ* and ψ* and of the parameter d*, that is to say the parameters $D_x^*$, $D_y^*$, an approximate ray PW characterized by the spherical coordinates α and β given by relations (9a) and (9b).

When the target image I* is scanned in pace with the provision by block 113 of the coordinates of the pixels of the various lines of this image, one after the other, the light ray PW scans a region K* of a sphere S, with center P, represented in FIG. 8. Each approximate ray PW intersects the sphere S in the region K* at a point K. There will be as many points of intersection K in the region K*, on the surface of the sphere S, as light rays PW, that is to say pixels, in I*. With each of these points K of the sphere S, is associated a calculated pair α, β. The dimension of the area K* scanned on the sphere S depends on the parameters Δθ* and Δφ* defined above, that is to say, on the dimensions $V_x^*$ and $V_y^*$ of the target image I* (with given $D_x^*$ and given $D_y^*$).

The geometrical transformation $G^{-1}$, defined by relations (5) and (9a), (9b) consists, therefore, of a "projection" of the target image H* onto the spherical region K*. Through this projection, points K(α,β) of K* are determined which correspond to the points M*(X*,Y*) of I*. This determination is undertaken in real time by virtue of the calculation means depicted by block 220 in the diagram of FIG. 13.

The sphere S, represented in FIG. 8, is a purely theoretical construction intended to elucidate, to those skilled in the art, how to tabulate the complicated function F.

In order to tabulate the function F, a "resolution" is determined A PRIORI in pixels per radian on the sphere S which is at least as good as any possible "resolution" of the target image I*. Thus, a quantity of pixels $K_o$ with address ($α_o$, $β_o$) and distributed over the surface of the sphere, here within the relevant region K*, is chosen A PRIORI. The address ($α_o$, $β_o$) of each given pixel $K_o$ consists of the spherical coordinates ($α_o$, $β_o$) of the radius $PK_o$ of the sphere S. For each pair ($α_o$, $β_o$) linked to a given pixel $K_o$, the coordinates (X,Y) of corresponding points M of the source image I are calculated in a preliminary step by means of the trigonometric function F described earlier. In fact, through relations (10a), (10b) and (11a), (11b) for each pair (α, β), the coordinates X, Y are fixed and can be determined once and for all from the moment the parameters φ, θ and d of the source image I are known.

Thus, according to the invention, by assumption, the source image I is a fixed image, the parameters of which are known A PRIORI. Hence, the pairs of coordinates (X,Y) calculated by F from pairs of spherical coordinates ($α_o$, $β_o$) can be stored in a memory area 204, also called a TABLE (LUT), at the addresses constituted by these chosen pairs ($α_o$, $β_o$).

Stated otherwise, the precalculated coordinates (X,Y) of points M of the source image I are entered into a table (LUT) for each address ($α_o$, $β_o$) constituted by the spherical coordinates of chosen pixels $K_o$.

Now, in the address calculator represented in FIG. 13, the means 220 calculate, through the function $G^{-1}$, in real time, one pair (α, β) for each pair (X,Y).

These calculation means 220 comprise, for example, two numerical "ramp generators", one in order to provide α by implementing the linear relation (9a) and the other in order to provide β by implementing the linear relation (9b). Thus, through the means of the invention, the function $G^{-1}$, which comprises variables which change whenever the user chooses new settings for the target image, becomes sufficiently simple to be calculated in real time.

Referring to FIG. 13, the next block 204 receives the result of the calculations performed in block 220, consisting of calculated pairs (α, β). This block 204 is the table (LUT) in which are stored the results of the calculations by the function F and which are applied to the pairs ($α_o$, $β_o$) chosen A PRIORI, that is to say, the points M(X,Y) corresponding to the points $K_o$ ($α_o$, $β_o$). Addressing means will search, in the table 204, for the address ($α_o$, $β_o$) which corresponds best, to within the resolution of the table, to the calculated address (α, β) provided by the calculation block 220. At this address ($α_o$, $β_o$) are the coordinates (X,Y) of a point M of the source image I which is thus matched up with the starting pixel M*(X*,Y*) of the target image I*.

Hence, in the construction of the target image according to the invention, two kinds of distinct approximations are involved.

- A first approximation in the calculation of the spherical coordinates (α, β) of an inexact light ray PW, in place of the real light ray Pμ, owing to the fact that simplified linear relations in X*, Y* are chosen for the function $G^{-1}$ in place of the exact equations linking (X*,Y*) to (α, β).

- A second approximation in the determination of the points M(X,Y), owing to the fact that the coordinates (X,Y) are provided, like the pairs, calculated exactly, A PRIORI by the function F, which correspond to pairs ($α_o$, $β_o$) which are predetermined A PRIORI and pretabulated, and not to the pairs (α, β) actually calculated by $G^{-1}$.

Block 204, for example, a table of the LUT kind (standing for LOOK UP TABLE), can be loaded directly in an initialization step with the aid of the data which relate to the source image and are contained in the functional block 21 and to which the function F is applied for a number of predetermined pairs ($α_o$, $β_o$).

Block 21 is a memory block which stores the parameters of the source image φ, θ and d.

D/ Image processing device comprising fixed cameras and a system simulating a mobile camera.

The invention also relates to an image processing device comprising:

- a system of n fixed real cameras arranged in such a way that their individual fields of view blend to form a single wide-angle field of view for observing a panoramic scene,
- an image construction system simulating a so-called virtual, mobile camera continuously scanning the panoramic scene in order to provide, in real time, a so-called target sub-image thereof corresponding to an arbitrary piece of the wide-angle field of view and constructed from adjacent source images provided by the n real cameras, this virtual camera having a view point merged with, or close to that of, the real cameras.

This invention finds its application in the telesurveillance sector or else in the television sector when shots covering wide fields are necessary, for example, in the case of the recording of scenes from sports events. The invention also finds its application in the automobile construction sector in the production of peripheral and panoramic rear-view mirrors having no dead angle.

As application of the image reconstruction system described earlier, the present invention has the aim of providing a device capable of simulating a mobile camera scanning the wide-angle field of view covered by the n fixed cameras whose fields of view blend.

The aim of the present invention is most particularly to provide such a device simulating a camera furnished with all the facilities which an actually existing mobile camera could have: that is to say, based on an observer who is fixed, possibilities of horizontal angular movements to the left or right of a panoramic scene under observation or surveillance, possibilities of vertical angular movements towards the top or bottom of this scene, and furthermore possibilities for zooming in on a portion of the area of this scene.

Technical problems then arise when constructing the target image. Indeed, in order to provide the facilities of a real camera, the virtual camera must first of all allow construction of the target image in real time. This implies that the calculation time must be sufficiently small. Now, the construction of the target image in the case envisaged in fact poses technical problems of complicated geometrical calculations.

A first problem stems from the fact that, although a plurality of real cameras is available, positioned in an adjacent manner and in such a way that the field covered by each does not miss out any region of the panoramic scene to be constructed, and although all the data is thus available to construct the target image, nevertheless, at each boundary between the cameras, on passing from an image provided by one camera to another image from an adjacent camera, in respect of two adjacent regions of the scene which are recorded by these two different cameras, there are large image distortions due purely to the difference in viewing angle of the two cameras.

A second problem stems from the fact that, in most cases, in order to carry out surveillance over a wide-angle field of view while using a minimum number of fixed real cameras, the real cameras employed are cameras whose optics are themselves of the "wide-angle" (or FISH-EYE) type. This type of objective produces sizable and typical distortions. In particular, the horizontal and vertical lines are shaped like an arc of a circle.

It follows that, if the problems mentioned are not solved, the target images which are produced straddling two regions of the scene recorded by two different cameras are very uncomfortable to view and totally lack precision.

This is why the geometrical matching of the image portions originating from various fixed real cameras must be accomplished while taking note of and compensating for the distortions due:

to the difference in the viewing angles, to the optical defects of the objectives of the fixed real cameras.

Moreover, this image processing must be accomplished in real time.

An aim of the invention is therefore to provide a device which fulfils the function of reconstructing the target image in real time while circumventing the need to use complex geometrical transformations which may only be carried out with the expensive commercial products, as was stated earlier.

According to the invention, this aim is achieved by means of an image processing device described below.

With this device, the user who is surveying a panoramic scene obtains exactly the same comfort, and the same services as would a user possessing a mobile camera, with a zoom, and with mechanical means for producing the variation in the orientation of the optical axis, that is to say, for producing variations in tilting and in panning when viewing. The advantage is that the mechanical means are precluded. These mechanical means, which incorporate motors for mechanical rotation of tilting angle and panning angle, and a motor for adjusting the zoom, are still linked to drawbacks: firstly, they may seize up, next, the movements generated are very slow. Moreover, they are very expensive. Lastly, as they are usually installed outdoors, they rapidly deteriorate owing to the weather. The electronic image processing means used according to the invention preclude all these drawbacks since they are very precise, reliable, very rapid and easy to operate. Furthermore, they can be arranged indoors, and thus sheltered from the weather. Moreover, the electronic means are easily programmable for automatic operation. Lastly, they are less expensive than the mechanical means.

Thus the user obtains, with the means of the invention, firstly an image which is pleasing to observe, and, secondly, greater precision and facilities for executing viewing maneuvers, than if he possessed mechanical means. Furthermore, a panoramic scene of wider field can be observed, since fields of 180° or even 360° can be observed, depending on the number of cameras used.

This results in a great advance in the realm of surveillance.

The fact of using several cameras to capture the data required to construct the target image is not a disadvantage since such an assembly of fixed CCD (charge coupled device) cameras has become less expensive than would the mechanical devices for varying tilting, panning and rotation, as well as zoom, associated with a single mobile real camera.

D1/ The picture-taking system.

Figure 10:
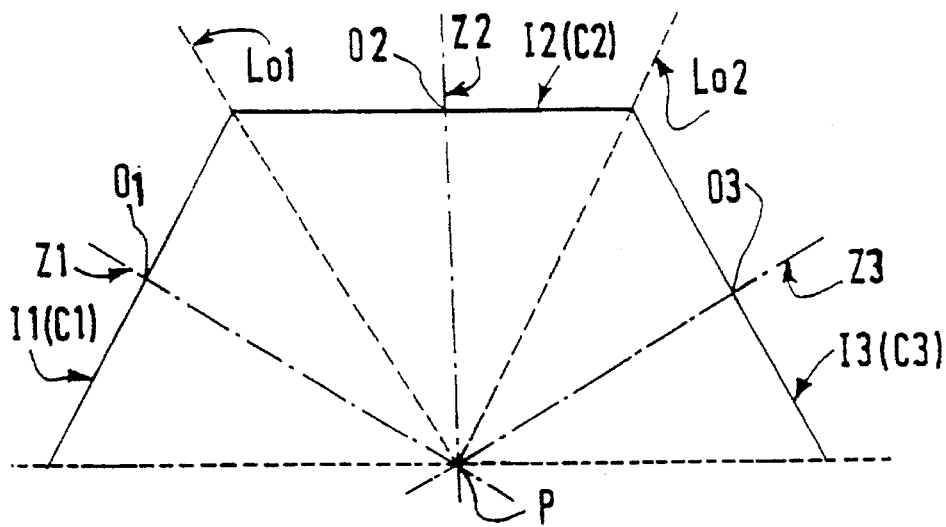
FIG. 10 represents, in a plane perpendicular to the source image plane, three adjacent source images produced by three fixed real cameras whose fields of view blend.

FIG. 10 shows, in section, a possible arrangement of several real fixed cameras for recording the data relating to a 180° angle scene. The recording of this panoramic scene is undertaken with three fixed cameras C1, C2, C3. The optical fields of the cameras are such that absolutely all the details of the panoramic scene are recorded by one camera or another, so as not to let any object evade surveillance. The cameras are arranged so as to have a common view point P or view points which are very close together.

The axes PZ1, PZ2, PZ3 represent, respectively, the optical axes of the cameras C1, C2, C3; and the points 01, 02, 03 represent respectively the geometrical centers of the images I1, I2, I3, in the image planes, on the optical axes.

Those skilled in the art can, without a more thorough description of the various arrangements of the fixed cameras in relation to one another, effect any kind of observation of a panoramic scene.

Generally, the picture-taking device comprises a plurality of n fixed real cameras, with fixed and known focal lengths, arranged in adjacent manner, and in such a way that their individual fields of view blend to cover a wide-angle field of view. Thus, the n adjacent fixed cameras provide n adjacent fixed images, so that this picture-taking device can survey a panoramic scene. The optical fields of the cameras are such that all the details of the panoramic scene are recorded by one camera or another, so as not to allow any object to evade surveillance.

In order to obtain this result, these n adjacent fixed cameras are furthermore arranged so that their optical centers P, also called view points coincide.

In fact, the view points of the n cameras cannot coincide physically. However, the condition of coincidence is considered hereafter to be sufficiently well satisfied if the distance which separates each of these view points from one another is small in relation to the distance from the panoramic scene filmed, for example, if their respective distance is 5 cm or 10 cm, and the distance from the panoramic scene is 5 m. Thus the condition of coincidence is reckoned to be satisfied if the ratio of these distances is of the order of, or greater than, 50.

D2/ The formation of the images by the cameras.

The aim of the invention is to provide a digital image reconstruction system which simulates a mobile camera capable, with settings chosen by a user, of providing, in real time, a digital image of any portion, or sub-image, of the panoramic scene recorded by the n fixed cameras.

The n cameras respectively provide so-called digital source images I1 . . . , Ii, Ij . . . , In. In what follows, the source images Ii and Ij formed by two adjacent fixed real cameras out of the n will be considered as an example.

Figures 9A, 9B:
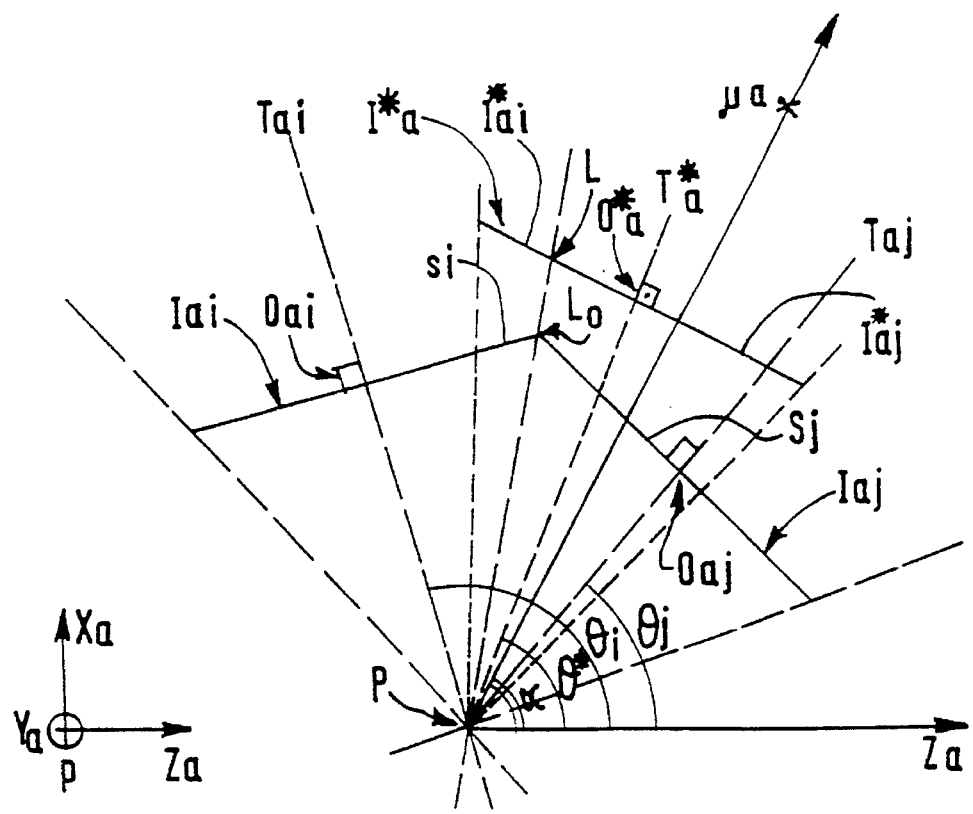
FIG. 9A represents the projection in the horizontal plane of the absolute frame of two adjacent source images, and of a target image reconstructed from these two source images.
FIG. 9B represents separately the horizontal plane of the absolute frame.

Referring to FIG. 9A, these contiguous fixed real cameras Ci and Cj form respective images of the panoramic scene in adjacent source image planes Ii and Ij. Referring to FIG. 9B, the absolute frame PXa, PYa, PZa is defined, with orthogonal axes, and in which the axes PXa and PZa are horizontal, and the axis PYa is vertical.

The source images Ii and Ij are digitized and each pixel M of these images is referenced by its coordinates in an individual frame linked to each image plane as was described earlier when referring to FIGS. 3A and 3B.

Once the individual frames linked to each image plane of the cameras have been established, these fixed source image planes can be linked to the terrestrial frame by:

their panning angle $\theta i$, $\theta j$, their tilting angle $\phi i$, $\phi j$.

In FIG. 9A, the axes PTai and PTaj are the projections of the optical axes PZi and PZj, the points Oai, Oaj are the projections of the optical centers Oi and Oj, and the segments Iai and Iaj are the projections of the image planes Ii and Ij in the plane of the figure, which is the horizontal plane (PZa, PXa) of the absolute frame.

Hence, in FIG. 9A, $\theta i=(PTai, PZa)$; $\theta j$ (PTaj, PZa). The angles $\phi i$ and $\phi j$ relating to the source images Ii and Ij can be determined as stated earlier when referring to FIG. 6A, so that $\phi i=(PZi, PTai)$ and $\psi j=(PZj, PTaj)$.

Figure 11A:
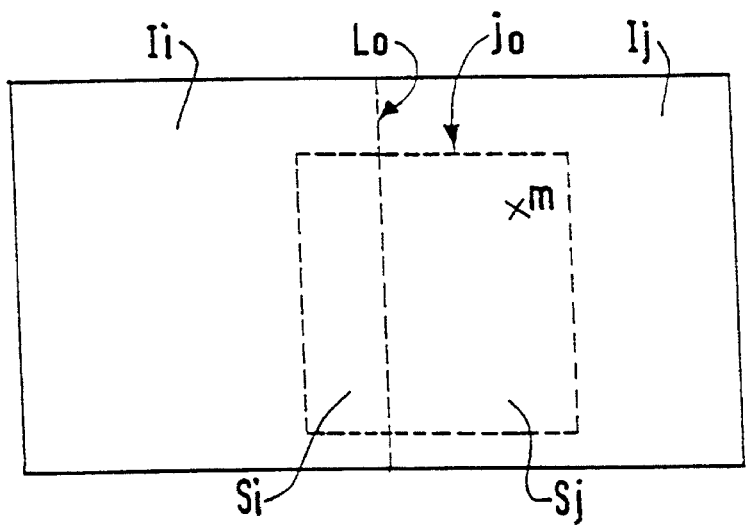
FIG. 11A represents the delimiting, in two adjacent source images, of a portion straddling these two images, by means of parameters fixing a tilting angle, a panning angle and a scale factor, for the reconstruction of a target image such as represented in FIG. 11B.

FIG. 11A shows, head-on, the adjacent images Ii and Ij of the panoramic scene which are provided by two contiguous fixed cameras Ci and Cj. In FIG. 11A, to simplify the account, the images Ii and Ij are both represented head-on in the plane of the figure, while in reality these images enclose an angle equal to that of the optical axes of the fixed cameras. In these images, the user can choose to look at any sub-image delimited by the line Jo, further to the left or further to the right, further up or further down, with the same magnification as the fixed cameras, or with a higher magnification or possibly with a lower magnification.

The simulated mobile camera is capable of constructing the target image I* from source image portions Si, Sj delimited by the line Jo of FIG. 11A. This camera referenced C* hereafter is called a virtual camera owing to the fact that it simulates a camera which does not actually exist. Obviously, this mobile camera is not limited to exploring the two images Ii, Ij. It can explore all the source images from I1 to In, as was stated earlier; and it can possibly construct the target image from more than two adjacent source images.

The target image I* is defined as before by means of:

its panning angle $\theta^*$ its tilting angle $\phi^*$ its resolution $D_x^*$, $D_y^*$, that is to say its scale factor $d^*$, its height $2V_y^*$ parallel to the columns and its width $2V_x^*$ parallel to the rows of pixels. Its view point is merged with the approximate view points of the fixed real cameras, and with the absolute origin P. The point O* is the geometrical center of the target image I*.

FIG. 9A shows the projection denoted Ia* of the image plane of the virtual camera in the horizontal plane, and its optical axis PTa* passing through the projection Oa* of the geometrical center O* of the target image I*.

Thus, by varying the panning angle and tilting angle, $\theta^*$ and $\phi^*$, and its scale factor $d^*$, and its framing $2V_x^*$, $2V_y^*$, the virtual camera is wholly akin to a real-time mobile camera which scans the wide-angle field of view formed by the blended fields of view of the various fixed real cameras.

Referring to FIG. 11A, it will be observed that the virtual camera C* can view a small portion (or sub-piece), delimited by Jo, of the wide-angle field of view and produce a magnified image I* thereof with, for example, the same final size as each of the images I1 . . . In provided by each of the real cameras, by altering its variable focal length PO*. It will also be observed that the movement of the field of view of the mobile camera C* can be continuous and arbitrary.

Below will be treated the case in which the field of view corresponding to Jo straddles two portions (Si,Sj) of image Ii and Ij which are contiguous at LO and are provided by two adjacent cameras. Those skilled in the art will be able subsequently to generalize to other cases relating to more than two source images.

Figure 11B:
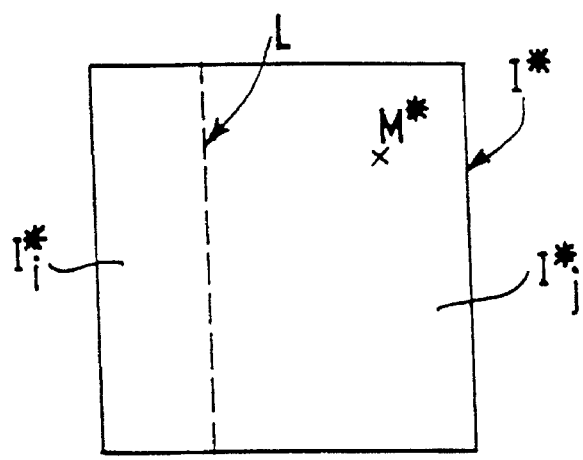

Referring to FIG. 11B, in the case where the image I* constructed by the virtual camera C* contains two different image portions, one Ii* is constructed from information Si contained in the digital image Ii, and the other Ij* is constructed from information Sj contained in the digital image Ij. In FIG. 9A, Iai* and Iaj* represent the projections of the target images Ii* and Ij* in the horizontal plane.

As described earlier, an individual frame of rectangular coordinates is now defined for the digital target image I*. Each pixel M* of the target image plane I* is therefore referenced by its coordinates in this target individual frame.

We likewise define, based on the dimensions in terms of pixels $V_x^*$, $V_y^*$ of the target image, an optical definition of this image, that is to say the definition in number of pixels per radian $D_x^*$ in the horizontal direction and number of pixels per radian $D_y^*$ in the vertical direction.

D3/ The process for constructing the target image from source images.

The task of the digital image processing means according to the invention is therefore the construction in real time of the "target image" provided by the virtual camera, from "source images" provided by the fixed real cameras.

Figure 12A:
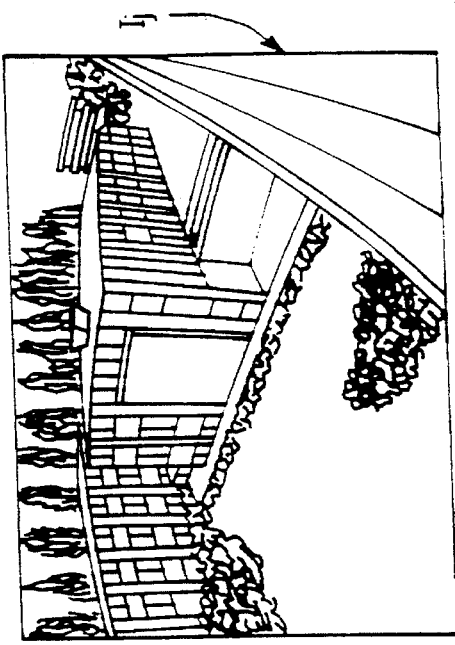
FIG. 12A represents a left source image.
Figure 12B:
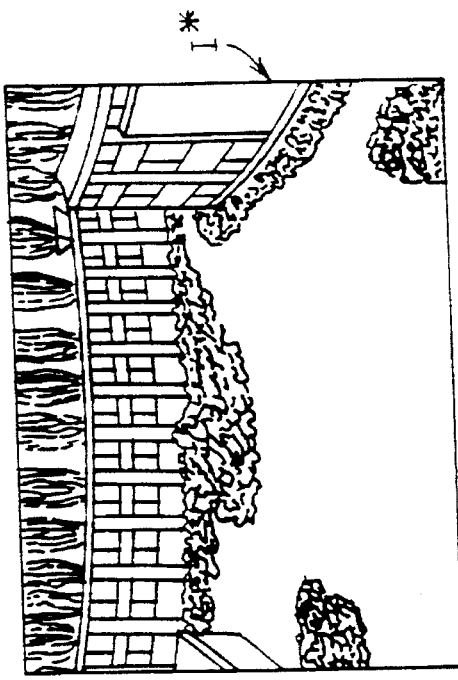
FIG. 12B a right source image adjacent thereto.

We saw that, in the construction of the target image I*, a technical problem arose due to the fact that the adjacent left and right images Ii and Ij provided by the contiguous real cameras, such as represented in the form of digital images of a landscape in FIGS. 12A and 12B, respectively, show distortions which cause them not to join up correctly: in particular certain portions of straight lines are curved, the verticals are not vertical etc. This means that, at the join, these lines will be secant instead of being in alignment with one another. Moreover, the source image portions on either side of the join originate from portions of the panoramic scene to be observed which are viewed under different perspectives. It follows that the target image portions Ii* and Ij* could join up poorly, as is apparent in the target digital image represented, by way of example, in FIG. 12C and formed by purely and simply juxtaposing the portions of the left and right adjacent digital images of FIGS. 12A and 12B.

The present invention proposes a process and means for circumventing these defects and for providing a digital image reconstructed in real time which is free from defects of distortions and of perspectives, and the portions Ii* and Ij* of which it is composed join up in such a way that the boundary line is invisible to the observer and user.

Figure 12C:
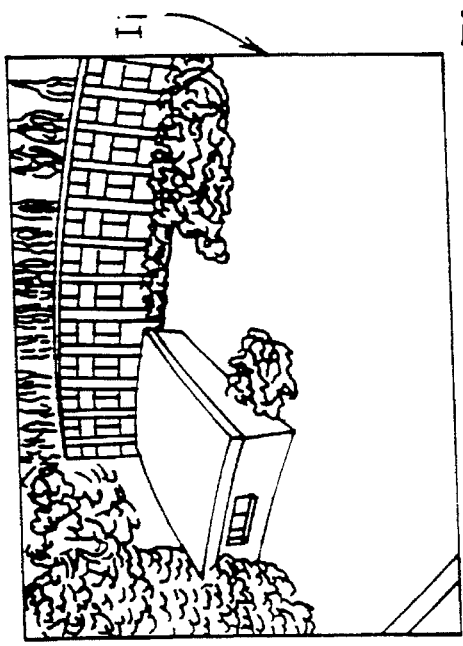
FIG. 12C represents the target image which would be obtained simply by making the respective right and left edges of the left and right sources coincide.
Figure 12D:
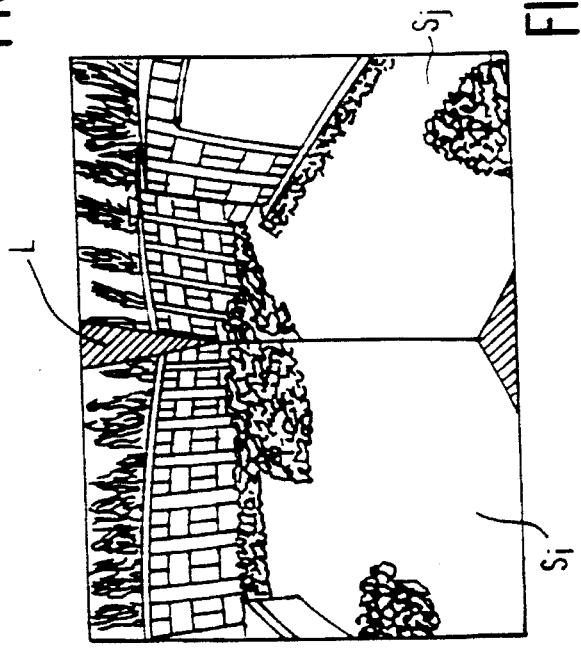
FIG. 12D represents the target image obtained by applying to these two starting source images the image processing system according to the invention.

FIG. 12D shows the digital image of the landscape of FIG. 12C, in which the defects of distortion and perspective have been corrected by the means of the invention.

Those skilled in the art, if apprised, may notice that there is a very slight defect in the horizontal lines which are slightly rounded as would occur if the picture had been taken directly with a wide angle objective through a real camera. This makes the reconstructed image more natural.

However, it will be noted that distortions of this kind, akin to those of a wide-angle optic, are much smaller in the reconstructed image of FIG. 12D than in a real image such as that of FIG. 12A or FIG. 12B. Furthermore the target image construction boundary, which was seen in FIG. 12C, no longer exists in FIG. 12D.

The general process for constructing the target image comprises various steps which are implemented by the signal processing device described further on.

This process comprises firstly a step in which:

each pixel M* having an address (X*,Y*) in the target image I* is matched with a point M at an address (X,Y) in a source image, this address being defined by:

the reference or index of the real camera which will provide the source image;

the address (X,Y) of the point M in this source image.

This process then comprises a second step in which:

the most probable value of the luminance Q is evaluated at this point M of the source image, then this luminance value is assigned to the pixel M* in the target image.

These steps are undertaken for all the pixels M* of the target image I*.

The processing means endows the target image, constructed in real time, as far as possible, with all the qualities of an image which is comfortable for the observer:

minimal distortions, adjustment of the perspectives, absence of break at the boundary between two adjacent images.

D4/ The image processing device.

Figure 14:
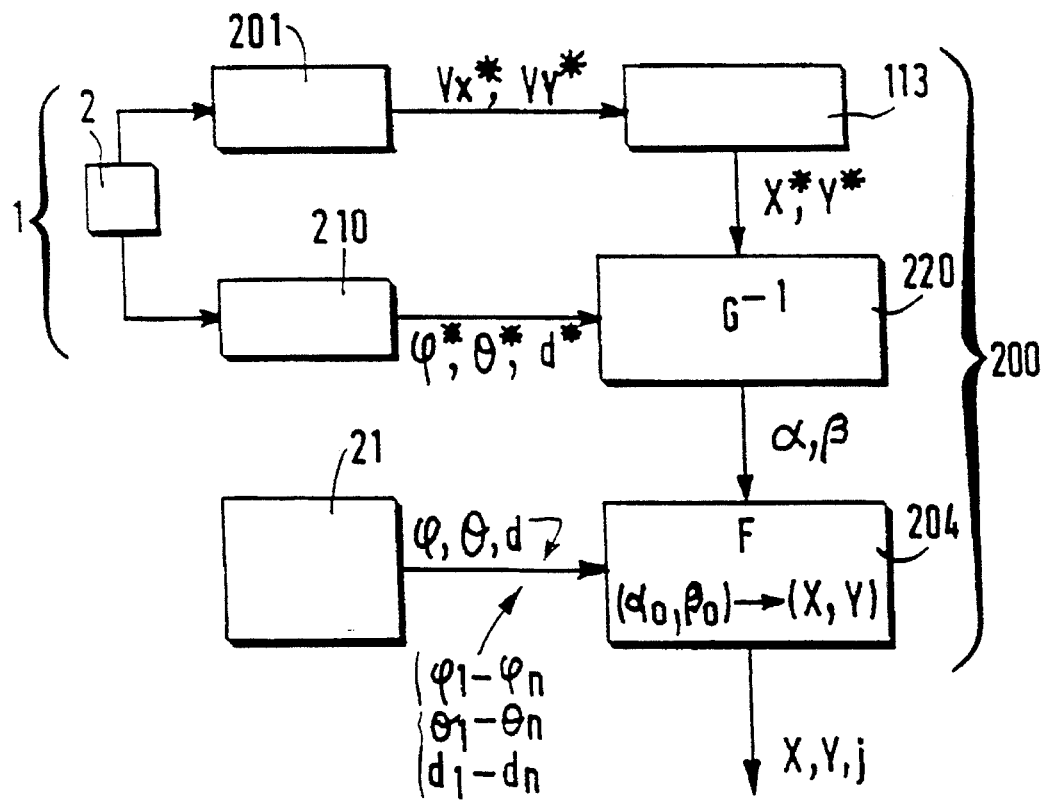
FIG. 14 represents as functional blocks a diagram of an image processing device incorporating an address calculator according to FIG. 13.

FIG. 14 shows in the form of functional blocks the various elements of the image processing device according to the invention.

Blocks I1, Ii, Ij ..., In represent n memory planes whose outputs provide the n source images denoted I1, ... Ii, Ij ..., In.

Each of the source images is assigned picture parameters corresponding to the orientation of the corresponding real camera with respect to the scene, as well as a scale factor. These parameters must be known or determined very precisely.

The assembly 1 represents a control system which enables the user to choose and display parameters relating to the orientation and framing of the virtual camera C*.

The assembly 100 is the image reconstruction system which makes it possible to calculate, from source images I1 ... In provided by real cameras, the target image I* which would be given by the virtual camera C* oriented and steered with the parameters defined by the control system, this virtual camera C* being arranged so that its view point is merged with or close to the view point P of the real cameras.

The block 10 corresponds to display means, or else recording means, which can be among other things a digital display monitor for real-time display and/or a video recorder for recording on magnetic tape etc.

Furthermore, it should be noted that the real cameras can provide analog data. In this case, analog/digital conversion modules, not represented, are used to form the digital source images.

Advantageously, those skilled in the art can choose charge coupled cameras (CCD, Charge Coupled Device). This kind of camera is inexpensive, lightweight, robust and reliable. Its resolution is very good and may yet increase in the future as the technology progresses.

Referring to FIG. 13, the image processing device comprises in particular:

in the assembly 1, a user interface 2, and means of storage 210 of the parameters $\phi^*$, $\theta^*$, $d^*$ and means of storage of the framing $V_x^*$, $V_y^*$ of the virtual camera C*.

Referring to FIG. 14, the device also comprises:

in the assembly 100, an address calculator 200, incorporating an address generator 113 which generates the addresses (X*,Y*) of the pixels of the target image I*, pixel by pixel, in such a way as to cover the whole of this target image I*; and means of storage 21 of the parameters $\phi_1$ to $\phi_n$, $\theta_1$ to $\theta_n$, and $d_1$ to $d_n$ the scale factors of the real cameras C1 to Cn, respectively, means of storage 117.

For each pixel M* of the target image I* to be constructed, an address (X*, Y*) is provided by the block 113 generating addresses in the target image I*. Depending on the settings chosen by the user which are entered into the control block 1 by means of a user interface proper 2, and which are stored in the form of parameters $\phi^*$, $\theta^*$, $d^*$ and $V_x^*$, $D_y^*$ of the virtual camera in the blocks 210 and 201, respectively, and depending on the parameters $\phi_j$, $\theta_j$ and $d_j$ (j here representing the index of all the cameras from 1 to n) of the real cameras and which are stored in block 21, the address calculator 200 provides the index j (from among all the indices 1 to n) of the real camera capable of providing the image Ij wherein are the data corresponding to the address (X*, Y*) of the pixel M* of the target image I*, and calculates the address (X,Y) of the corresponding point M in this selected source image Ij, and does so via the various transformations or perspectives prescribed by the user at 2.

Through these operators, a correspondence is therefore established between a pixel M* at a given address (X*,Y*) of the target image I*, and a point M at a calculated address (X, Y) of a source image Ij.

Then, the value of the luminance Q at the point M at the address (X,Y) in the source image Ij is determined, so as to be assigned to the corresponding pixel M* at the address (X*,Y*) in the target image I*. The same is done for all the pixels of the target image I*.

However, whereas the address (X*,Y*) in the target image I* is actually that of a pixel M*, contrastingly, the address (X,Y) in the source image Ij is really a calculated address, which implies that, in general, this found address does not coincide with a pixel but with a point M lying between pixels. The luminance of this point M must therefore also be calculated.

This problem is handled by the interpolator 112.

The interpolator 112 take note of a value of a luminance function of the pixels, for example m1, m2, m3, m4 of a neighborhood of the point M(X,Y), in order to calculate the luminance function corresponding to the point M(X,Y) in question by an interpolation process. Thus, block 112 calculates the most probable luminance function to be assigned to this point M with address (X,Y).

The luminance function Q calculated by the interpolator at the address (X,Y) in the source images is next allocated as luminance function value to the pixel M* situated at the starting address (X*, Y*) in the target image I*, and stored in block 117.

The address calculator 200 used is the one which was described earlier in detail when referring to FIG. 13, in the case of the processing of a single source image.

In the case of several source images the calculator 200 comprises in particular:

the module 204, which is "loaded" during an initialization step with the data stored in block 21, relating to all real cameras, and which provides, directly, the index j of the source image and the address (X,Y) in this source image, these data being "read from the sphere S" at the pixel $K_o$ ($\alpha_o$, $\beta_o$) corresponding to the point $K(\alpha,\beta)$ calculated by the module 220, as already described.

Referring to FIG. 14, the image I* can then be recreated in the storage block 117 by matching each pixel M* having address (X*,Y*) with a value of the luminance function Q. The target image is now constructed.

The image I* can subsequently be displayed, or stored in the means 10.

If the case obtains in which several source images are possible, for example, because of an overlap of the source images in a boundary zone, block 204 is tabulated in order to provide just one of the two source images directly.

For this purpose, during tabulation, a process for selecting between two images consists in deciding that the join between two images in the boundary zone consists of a straight line which passes substantially through the middle of the overlap region. This convention is applicable to the case of cameras juxtaposed horizontally as in FIG. 10 with vertical joins.

By way of comment, it should be noted that what was stated in respect of the coding of pixels by grey level or luminance can be applied to the coding of a color image. The coding is simply performed over a larger number of bits.

Thus, in variants of the invention, the function Q to be determined at the point M of a source image I or Ij and to be allocated to the pixel M* of the target image I*, can be:

either the luminance function already described, or a chrominance function, or a function of luminance and of chrominance, or an X-ray intensity function, or a γ-ray intensity function, etc.

Generally, the function Q is a characteristic function of the digital signal at point M calculated in the source image.

It will be noted that, so that no join is noticeable in the target image, it is necessary to take several measures:

precise calibration of the fixed cameras, correction of the results through feedback and followed by possible modification of the parameters of the models of fixed cameras until perfect juxtaposition is obtained culminating in a defect-free target image.

This operation, or initialization, should be understood as an integral part of the calibrating operation.

What is claimed is:

1. A method of processing images for constructing a digitized target image from a digitized source image having a fixed frame line, and including pixels each having a digital signal value, said source and target images having substantially common view points, said method comprising the steps:

(a) determining a fixed set of orthonormal reference axes originating at said common view point;

(b) generating a fictive spherical surface centered at the common view point, provided with pixels at a predetermined resolution;

(c) generating an address for each pixel on said spherical surface, associated with a couple of spherical coordinates, constituted of orientation angles, with respect to said set of orthonormal reference axes, of a fictive straight light ray passing through said common view point and through said pixel of the spherical surface;

(d) calculating, for each spherical coordinates couple, a corresponding address of a point situated at the intersection of the source image and of the corresponding fictive straight light ray, by using a direct perspective trigonometrical transform;

(e) storing the address of said corresponding point of the source image at the address of said pixel of the fictive spherical surface associated with said spherical coordinates couple;

(f) generating an address for each pixel of the target image;

(g) calculating, on the basis of the address of a pixel, called the initial pixel, in the target image, approximate orientation angles, with respect to said fixed set of orthonormal reference axes, of an actual straight light ray passing through said initial pixel and said common view point, by using an inverse perspective linear transform;

(h) determining an address of a point in the source image, by matching at best the approximate orientation angles related to said initial pixel with a stored spherical coordinates couple;

(I) calculating a function characteristic of the digital signal value at said point in said source image and assigning said value to said initial pixel in said target image; and (j) repeating steps (g) to (I) for each pixel of the target image.

2. A method as claimed in claim 1, wherein said method further comprises the calibration steps:

storing parameters of the source and target images, respectively, including a scale factor, and orientation angles constituted by an azimuth angle and a sight angle defined in said fixed set of orthonormal reference axes, and dimensions of the frame of the target image; and constructing respective real and virtual camera models for providing said source and target images with said fixed view point which is substantially common with the origin of said fixed set of orthonormal reference axes, and with said respective parameters.

3. A method as claimed in claim 2, wherein said step of determining the fixed set of reference axes comprises defining a horizontal plane and a vertical axis; said step of calculating approximate angles of the actual straight light ray passing through the initial pixel and through the common view point comprises:

respectively defining a target image local set of orthonormal reference axes, and a source image local set of orthonormal reference axes, calculating the address of the initial pixel, as a couple of coordinates in said target image local set of reference axes, and calculating said couple of approximate angles by using a couple of linear relations constituting said inverse linear transform which, respectively, makes to coordinates of the initial pixel linearly correspond to the orientation angles of said actual straight light ray defined, respectively, in the horizontal plane and in the vertical plane of the fixed set of reference axes, said linear relations having the parameters and the framing of said target image as coefficients, and said step of calculating the address of a corresponding point in the source image comprises:

calculating said address in the source image by using a couple of trigonometrical relations constituting said direct trigonometrical transform which transforms, respectively, the spherical coordinates in the spherical surface into a couple of coordinates in the source image local set of reference axes, said trigonometrical relations having the parameters of said source image as coefficients, and defining said couple of coordinates in said source image local set of reference axes as the address of the corresponding point in the source image.

4. A method as claimed in claim 3, wherein the step of calculating said couple of approximate orientation angles comprises utilizing, as inverse linear transform, the following couple of linear relations joining, respectively, an orientation angle defined in said horizontal plane to one of the initial pixel coordinates and an orientation angle defined in a vertical plane to another of the initial pixel coordinates:

$$\alpha = (1/D_x^*) \, X^* + \Theta^*$$

$$\beta = (1/D_y^*) \, Y^* + \phi^*$$

where $X^*$ and $Y^*$ are the coordinates of the initial pixel in the local set of reference axes of the target image, $\Theta^*$ is the panning angle, $\phi^*$ is the tilting angle, in the fixed set of reference axes, and $D_x^*$ and $D_y^*$ are, respectively, the resolutions of the target image parallel to said local reference axes of said target image, which depend on the scale factor, and on the frame dimensions of the target image; and the step of calculating said couple of coordinates of the corresponding point in the source image comprises utilizing, as direct trigonometrical transform, the following relations joining, respectively, said coordinates to said spherical coordinates in the spherical surface:

$$A = \arctan\left(\frac{\cos\beta_o \cdot \sin(\alpha_o - \theta)}{\cos\beta_o \cdot \cos(\alpha_o - \theta) \cdot \cos\phi - \sin\beta_o \sin\phi}\right)$$

and $Y = d.\tan B/\cos A$ with $B = \arcsin(\cos\beta_o \cdot \cos(\alpha_o - \theta)\sin\phi + \sin\beta_o \cos\phi)$.

5. A method of processing images for constructing a digitized target image from n adjacent digitized images having a fixed frame line and referred to as source images, the pixels of the source images having digital signal values, and said source and target images having substantially common view points, comprising:

(a') determining a fixed set of orthonormal reference axes originated at said common view point;

(b') generating a fictive spherical surface centered at the common view point, provided with pixels at a predetermined resolution;

(c') generating an address for each pixel on said spherical surface, associated with a couple of spherical coordinates, constituted of orientation angles, with respect to said set of orthonormal reference axes, of a fictive straight light ray passing through said common view point and through said pixel of the spherical surface;

(d') calculating, for each spherical coordinates couple, a corresponding address of a point situated at the intersection of one of the source images and of the corresponding fictive straight light ray, by using a direct perspective trigonometrical transform;

(e') storing the address of a corresponding point of said particular source image, associated with an index indicating the particular source image out of the n source images that the fictive straight light ray intersects, at the address of said pixel of the fictive spherical surface associated with said spherical coordinates couples;

(f') generating an address for each pixel of the target image;

(g') calculating, on the basis of the address of a pixel called initial pixel in the target image, approximate orientation angles, with respect to said fixed set of orthonormal reference axes, of an actual straight light ray passing through said initial pixel and said common view point, by using an inverse perspective linear transform;

(h') determining an address of a point in a source image, and an index indicating the particular source image where said point lies, by matching at best the approximate orientation angles related to said initial pixel with a store spherical coordinates couple;

(I') calculating a function characteristic of the digital signal value at said point in said particular source image and assigning said value to said initial pixel in said target image; and (j') repeating steps (g') to (j') for each pixel of the target image.

6. A method as claimed in claim 5, comprising calibration steps of:

storing parameters of the n source images including scale factors and orientation angles constituted by azimuth angles and angles of sight, said angles being defined in said fixed set of orthonormal reference axes, and dimensions of the frame of the target image;

storing parameters of the target image including scale factor and orientation angles constituted by an azimuth angle and a sight angle, said angles being defined in said fixed set of orthonormal reference axes; and constructing respective real and virtual camera models for providing said source and target images with said respective parameters and with said fixed view point which is substantially common with the origin of said fixed set of orthonormal reference axes.

7. A method as claimed in claim 6, for constructing the target image representing sub-portions of the fixed frame constituted by the n adjacent source images, comprising varying the target image parameters and the dimension of the frame of the virtual camera, the source image parameters of the real camera being fixed.

8. A method a claimed in claim 7, wherein the step of determining the fixed set of reference axes comprises defining a horizontal plane and a vertical axis; the step of calculating approximate angles of the actual straight light ray passing through the initial pixel and through the common view point comprises:

respectively defining a target image local set of orthonormal reference axes, and local sets of orthonormal reference axes for the source image, calculating the address of the initial pixel, as a couple of coordinates in said target image local set of reference axes, calculating said couple of approximate angles by using a couple of linear relations constituting said inverse linear transform, which makes, respectively, the coordinates of the initial pixel in the local set of reference axes, respectively, linearly correspond to the orientation angles of said actual straight light ray, respectively defined in the horizontal plane and in the vertical plane of the fixe set of reverence axes, said linear relations having the variable parameters and the framing of said target image as coefficients, an the step of calculating the address of a corresponding point in the source image comprises:

calculating said address, in the local set of reference axes of the source image, by using a couple of trigonometrical relations constituting said direct trigonometrical transform which, respectively, transforms the spherical coordinates in the spherical surface into a couple of coordinates in the source image local set of reference axes, said trigonometrical relations having the fixed parameters of the particular source image as coefficients, and defining said couple of coordinates in said particular source image local set of reference axes as the address of the corresponding point in the particular source image.

9. A method as claimed in claim 8, wherein the step of calculating said couple of approximate orientation angles comprises utilizing, as inverse liner transform, the following couple of linear relations joining, respectively, an orientation angle defined in said horizontal plane to one of the initial pixel coordinates, and an orientation angle defined in a vertical plane to another of the initial pixel coordinates:

$$\alpha = (1/D_x^*) X^* + \Theta^*$$

$$\beta = (1/D_y^*) Y^* + \phi^*$$

where $X^*$ and $Y^*$ are the coordinates of the initial pixel in the local set of reference axes of the target image, $\Theta^*$ is the panning angle, $\phi^*$ is the tilting angle, in the fixed set of reference axes, and $D_x^*$ and $D_y^*$ are, respectively, the resolutions of the target image parallel to said local reference axes of said target image, which depend on the scale factor, and on the frame dimensions of the target image; and the step of calculating said couple of coordinates of the corresponding point in the source image comprises utilizing, as direct trigonometrical transform, the following relations joining, respectively, said coordinates to said spherical coordinates in the spherical surface:

X=d.tan A with $$A = \arctan\left( \frac{\cos\beta_o \cdot \sin(\alpha_o - \theta)}{\cos\beta_o \cdot \cos(\alpha_o - \theta) \cdot \cos\phi - \sin\beta_o \sin\phi} \right)$$

and

Y=d.tan B/cos A with

B=arcsin($\cos\beta_o \cdot \cos(\alpha_o - \theta)\sin\phi + \sin\beta_o\cos\phi$).

10. An image processing device comprising:

a system of n fixed real cameras, n being an integer greater than 0, said real cameras being arranged such that their individual fields of view merge so as to form a single wide angle field of view for observation of a panoramic scene, said real cameras providing adjacent images referred to as source images;

an image construction system simulating a mobile virtual camera continuously scanning the panoramic scene so as to form a sub-image referred to as a target image corresponding to a selected section of a wide-angle field of view, and constructed from said source images;

means for digitizing said source and target images such that each pixel corresponds to a digital signal value;

calibration means for determining a substantially common view point to said source and target images, and a fixed set of orthonormal reference axes originated at said common view point;

an address generator for generating, pixel by pixel, respective addresses for the pixels of the target image;

an address computer including:

tabulation means for storing addresses of pixels provided on a fictive spherical surface, centered at the common view point, said pixels being disposed at a predetermined resolution, each of said addresses being associated with a couple of spherical coordinates constituted by orientation angles, defined with respect to said fixed set of orthonormal reference axes, of a fictive straight light ray passing through said common view point and through said pixel at the corresponding address of the fictive spherical surface, and each couple of spherical coordinates being associated with an index indicating a particular source image out of the n source images that the fictive straight light ray intersects, and being associated with an address of a corresponding point of said particular source image;

calculation means for calculating, on the basis of the address of a pixel called initial pixel in the target image, approximate orientation angles, with respect to said fixed set of orthonormal reference axes, of an actual straight light ray passing through said initial pixel and said common view point, by using an inverse perspective linear transform system;

addressing means for determining, from the tabulation means, an address of a point in a source image, and an index indicating the particular source image where said point lies, by matching at best the approximate orientation angles related to said initial pixel with a stored spherical coordinates couple;

calculation means for calculating a function characteristic of the digital signal value at said point in said particular source image; and means for assigning said value to said initial pixel in said target image.

11. A device as claimed in claim 10, wherein the calibration means further comprises:

virtual camera storage means for storing parameters relating to said virtual camera for supplying said address computer with scale factor and with orientation angles of an optical axis of the virtual camera, said orientation angle being constituted by the azimuth and the sight angle defined in said fixed set of orthonormal reference axes;

frame dimensions storage means for storing the frame dimensions of the target image, for supplying the address computer with the resolution of said target image; and real camera storage means for storing parameters relating to said real cameras for supplying said address computer with scale factor and with orientation angles of an optical axis of each real camera, said orientation angles being constituted by azimuth angles and angles of sight, defined in said fixed set of orthonormal reference axes.

12. A device as claimed in claim 11, wherein the address computer comprises:

first construction means for constructing a model of the virtual camera with the parameters stored in the virtual camera storage means and in the frame dimensions storage means; and second construction means for constructing models of the real cameras with the parameters stored in the real camera storage means.

13. A device as claimed in claim 10, wherein the calculating means of the address computer comprises:

two numerical ramp calculation modules for computing a geometrical transform, referred to as an inverse linear transform, one of said modules for calculating the first approximate spherical coordinate by a first linear relation having, as a variable, the first coordinate of the starting pixel, in a local set of reference axes of the target image, and the other of said modules for calculating the second approximate spherical coordinate by a second linear relation having, as a variable, the second coordinate o the pixel in said local frame, the coefficients of these linear relations being functions of the azimuth and sight angles, of the scale factor and of the framing of the target image.

14. A device as claimed in claim 10, wherein the address computer further comprises:

computing means for generating a fictive spherical surface centered at the common view point, provided with pixels at a predetermined resolution, for generating an address for each pixel on said fictive spherical surface, associated with a coupled of spherical coordinates, constituted of orientation angles, with respect to said fixed set of orthonormal reference axes, of a fictive straight light ray passing through said common view point and through said pixel of the fictive spherical surface;

computing means, referred to as direct trigonometrical transform, for calculating, for each spherical coordinates couple, a corresponding address of a point situated at the intersection of one of the source images and of the corresponding fictive straight light ray, and an index indicating the particular source image where said point lies, taking into account the models of the real cameras provided by the second construction means, the parameters constituted by the azimuth angles, the angles of sight, and the scale factors of the respective real cameras corresponding to said particular source image; and addressing means for storing the address of the corresponding point of said particular source image, associated with an index indicating the particular source image out of the n source images that the fictive spherical surface associated with said spherical coordinates couples in the tabulation means.

15. A device as claimed in claim 10, wherein the means for determining the function characteristic of the digital value comprises:

an interpolator for computing a most probable value of the digital signal at the address found by the address computer in said particular source image; and storage means for assigning said computed digital signal value corresponding to the address found in said particular source image to the initial pixel in the target image at the address furnished by said address generator.

16. A device as claimed in claim 10, further comprising a display system with a screen for displaying the target image in real time on said screen.

17. A device as claimed in claim 10, further comprising a recording system for recording the target image.

18. A device as claimed in claim 12, wherein the system for constructing the target image also comprises:

an interface module for enabling a user to define or to vary, in the virtual camera storage means, said parameters including the scale factor and the orientation of the optical axes, and, in the frame dimensions storage means, said framing for defining the target image as a sub-portion of the fixed frame constituted by the n adjacent source images.

19. A device as claimed in claim 18, wherein the interface module is controlled automatically.

20. A device as claimed in claim 18, wherein the interface module is controlled manually.

* * * * *